(12) United States Patent
Jablonski et al.

(10) Patent No.: US 6,272,521 B1
(45) Date of Patent: Aug. 7, 2001

(54) APPARATUS AND METHOD FOR ALLOWING OBJECT-ORIENTED PROGRAMS CREATED WITH DIFFERENT FRAMEWORK VERSIONS TO COMMUNICATE

(75) Inventors: Marc Jablonski, Palo Alto; Mark Davis, Menlo Park, both of CA (US)

(73) Assignee: Object Technology Licensing Corporation, Cupertino, CA (US)

(*) Notice: Subject to any disclaimer, the term of this patent is extended or adjusted under 35 U.S.C. 154(b) by 0 days.

(21) Appl. No.: 08/986,996

(22) Filed: Dec. 8, 1997

(51) Int. Cl.$^7$ .................................................. G06F 15/16
(52) U.S. Cl. ...................... 709/200; 709/231; 709/310; 707/203; 707/511
(58) Field of Search ..................................... 395/500, 700, 395/712; 709/201, 200, 230, 231, 303; 707/511, 200, 515, 523, 203; 717/11

(56) References Cited

U.S. PATENT DOCUMENTS

| 5,347,653 | * | 9/1994 | Flynn et al. ........................ 707/203 |
| 5,708,828 | * | 1/1998 | Coleman ............................. 707/523 |
| 5,742,818 | * | 4/1998 | Shoroff et al. ...................... 707/200 |
| 5,745,906 | * | 4/1998 | Squibb ................................ 707/203 |
| 5,832,275 | * | 11/1998 | Olds .................................... 717/11 |
| 5,915,112 | * | 6/1999 | Boutcher ............................ 709/330 |
| 5,951,638 | * | 9/1999 | Hoss et al. .......................... 709/206 |

FOREIGN PATENT DOCUMENTS

| 0317478 | 5/1989 | (EP) . |
| 0733968 | 9/1996 | (EP) . |
| WO9714091 | 4/1997 | (WO) . |

OTHER PUBLICATIONS

User Documentation, CommonPoint Application System, Version for AIX, Foundation Services, Taligent, Inc., 1995, "Streams", Chapter 2, pp. 67–84.

Hamilton, Graham & Radia, Sanjay, "Using Interface Inheritance to Address Problems in System Software Evolution", pp. 119–128.

* cited by examiner

Primary Examiner—Michael O'Neill
Assistant Examiner—Yveste G. Cherubin
(74) Attorney, Agent, or Firm—Kudirka & Jobse, LLP

(57) ABSTRACT

A set of stream writer and reader classes and methods enable object frameworks to communicate with each other despite problems with missing classes due to mismatched versions. The stream writers are modified to deal with a new version of a class that extends from a class in an existing version by writing alternate object information compatible with the existing version when the future object class information is streamed. In this manner, alternate object information is written for each older version. The information for each of the alternate objects corresponding to each older version is added after the existing object information as an extension with the length of the extension written at the beginning. The stream readers are modified so that when an older version stream reader reads the object information and does not understand the first alternate object (which might correspond to a later version), it skips the length specified for that extension and reads the second alternate object. If the second alternate object information is not understood, the reader skips the non-understood object information and continues with each alternate object. If none of the alternates is understood, then an exception is thrown. In one embodiment, the information for alternate objects which are not used is not discarded, but is instead saved in a temporary storage. Then, if the object is streamed out again, the stored information is added back into the stream.

30 Claims, 16 Drawing Sheets

APPARATUS AND METHOD FOR ALLOWING OBJECT-ORIENTED PROGRAMS CREATED WITH DIFFERENT FRAMEWORK VERSIONS TO COMMUNICATE

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office. All other rights are expressly reserved.

FIELD OF THE INVENTION

This invention relates to object-oriented computer programs created from object-oriented system frameworks and apparatus and methods for insuring compatability of such programs when the underlying system frameworks change.

BACKGROUND OF THE INVENTION

Software programs are continually becoming more complicated. Early programs consisted of straightforward procedural code that presented a simple, command line interface and text display to the user. These simple programs have gradually been replaced with complex programs that have graphical user interfaces and multiple features.

As programs have grown in complexity, the amount of effort which is required to write and debug the programs has also increased drastically. Consequently, major efforts have been made to reduce the amount of programming necessary to produce a modern, full-featured product. One of the most successful of these efforts has been the development of object-oriented programming in which programs are designed as collections of discrete elements called "objects". The objects can be modified and reused in many cases, thereby reducing the development effort.

As will be understood by those skilled in the art, objects in the context of object-oriented programming are software entities comprising data and operations on that data. The objects exist only at program runtime and are created, or instantiated, from object "classes" which are actually written by the programmer. The class code written by a programmer can be "reused" by another programmer by instantiating objects from that code. In addition, a developer can reuse class code by deriving new classes from existing classes by a process called inheritance. As is well-known, derived classes, or subclasses, inherit the characteristics of the classes from which they are derived. Inherited characteristics can be overridden and modified to customize the derived class.

In order to further ease the development burden, many products that support object-oriented programming provide libraries of classes that a developer can use and reuse by instantiation and subclassing as described above. With such libraries and the principles of inheritance, a developer can create and use families of related objects that share the same interface even though their contents and behavior differ.

Even though class libraries are very useful, they suffer from some drawbacks. For example, a large class library may include hundreds of classes in some cases and the relationship of classes can be very confusing. Unless a developer has detailed documentation, it may be difficult to understand what functions the classes are supposed to implement. It may also be difficult to make changes and additions without a thorough understanding of class relationships and operation. In addition, a program written with class libraries must still be responsible for the flow of control or the interactions between the objects instantiated from the classes.

Consequently, another approach called "frameworks" have been used to further reduce application development effort. A framework is a related set of classes which generate a set of objects that collaborate to solve a specific problem and provide a pre-fabricated structure of a working application. Since frameworks are based on object technology, the behavior of their objects can be inherited and overridden to allow developers to extend the framework and create customized solutions in a particular area of expertise. However, the problem which is solved by the framework is at a much higher level than that solved by the individual objects in a class library. For example, the objects in a framework might provide a basic word processor application whereas a class library might provide the individual functions of a word processor, such as selecting and copying text strings.

Problems remain when either class libraries or frameworks are used to develop an application program. These problems arise because the class libraries and frameworks can be changed and a new version of a class library or framework might eliminate classes or add new classes. Later when application programs written with the two different versions of the framework try to communicate and exchange objects, problems arise because the objects understood by both programs are different.

For example, programs often communicate by streaming data from one program to another. In such a streaming operation, a stream writer flattens, or marshals, object information to form a serial data stream. This object information takes the form of the class information which was used to create the object. The class information can be the original class information which was used to create the original object or, if the original object was an extension of another object, only the extension information may be sent.

The serial data stream is then sent to another application where a stream reader, resurrects, or de-marshals, the serial data stream to reconstruct a copy of the original object. If the class information was sent, it is used to construct the object. Alternatively, if only the extension data was sent, it is combined with class information already present at the destination and used to construct the object. Ordinarily, such an operation does not present a problem, but there can be difficulties when application programs built from two different framework versions attempt to communicate. Obviously, there may be classes unknown to a current framework version on streams which have been written by future versions because future versions can contain new classes. But future versions may not recognize some of the classes on streams from past versions if some of the old classes have been deleted in the new version. In many frameworks, the stream reader is intelligent and can recognize whether object data that it is reading corresponds to class data in the framework of which it is a part. When the stream reader encounters object data that it does not recognize, it may simply indicate that the stream is unreadable.

One prior art method of dealing with this problem is to include an object version number at the beginning of the stream. The stream writer inserts the object version number before writing any of the class elements to the stream. When the stream reader receives the stream it reads the object version and then can deal with the object appropriately. For example, a common way of dealing with different versions is to require a stream writer in a new framework version, which has a new streaming format, to increase the version number before writing the number to the stream. In addition, the stream reader in the new framework version must be able to read the older version class. This prior art solution works well when a new version stream reader reads old version files, but any file that includes a new version class will not be readable with an old framework version stream reader. The problem may be further exacerbated with stream writers which do not indicate the ends of streamed objects. In this case, the stream reader cannot simply skip the unknown class information and any stream which contains an unknown class is unreadable from that class onward.

Therefore, it would be desirable to have a framework system with both backward A data compatibility and forward data compatibility so that application programs designed with different versions of the framework could communicate. Backward data compatibility is the ability to read streams generated by previous versions of the framework, while forward data compatibility is the ability to read streams generated by future versions of the framework.

SUMMARY OF THE INVENTION

In accordance with the principles of the present invention, a set of stream writer and reader classes and methods enable object frameworks to communicate with each other despite problems with missing classes due to mismatched versions. The stream writers are modified to deal with a new version of a class that extends from a class in an existing version by writing alternate object information compatible with the existing version when the future object class information is streamed. In this manner, alternate object information is written for each older version. The information for each of the alternate objects corresponding to each older version is added after the existing object information as an extension with the length of the extension written at the beginning. The stream readers are modified so that when an older version stream reader reads the object information and does not understand the first alternate object (which might correspond to a later version), it skips the length specified for that extension and reads the second alternate object. If the second alternate object information is not understood, the reader skips the non-understood object information and continues with each alternate object. If none of the alternates is understood, then an exception is thrown.

In one embodiment, the information for alternate objects which are not used is not discarded, but is instead saved in a temporary storage (a "bit bucket"). Then, if the object is streamed out again, the stored information is added back into the stream. In this manner, no data is lost.

BRIEF DESCRIPTION OF THE DRAWINGS

The above and further advantages of the invention may be better understood by referring to the following description in conjunction with the accompanying drawings and which.

DETAILED DESCRIPTION OF THE PREFERRED EMBODIMENT

Figure 1:
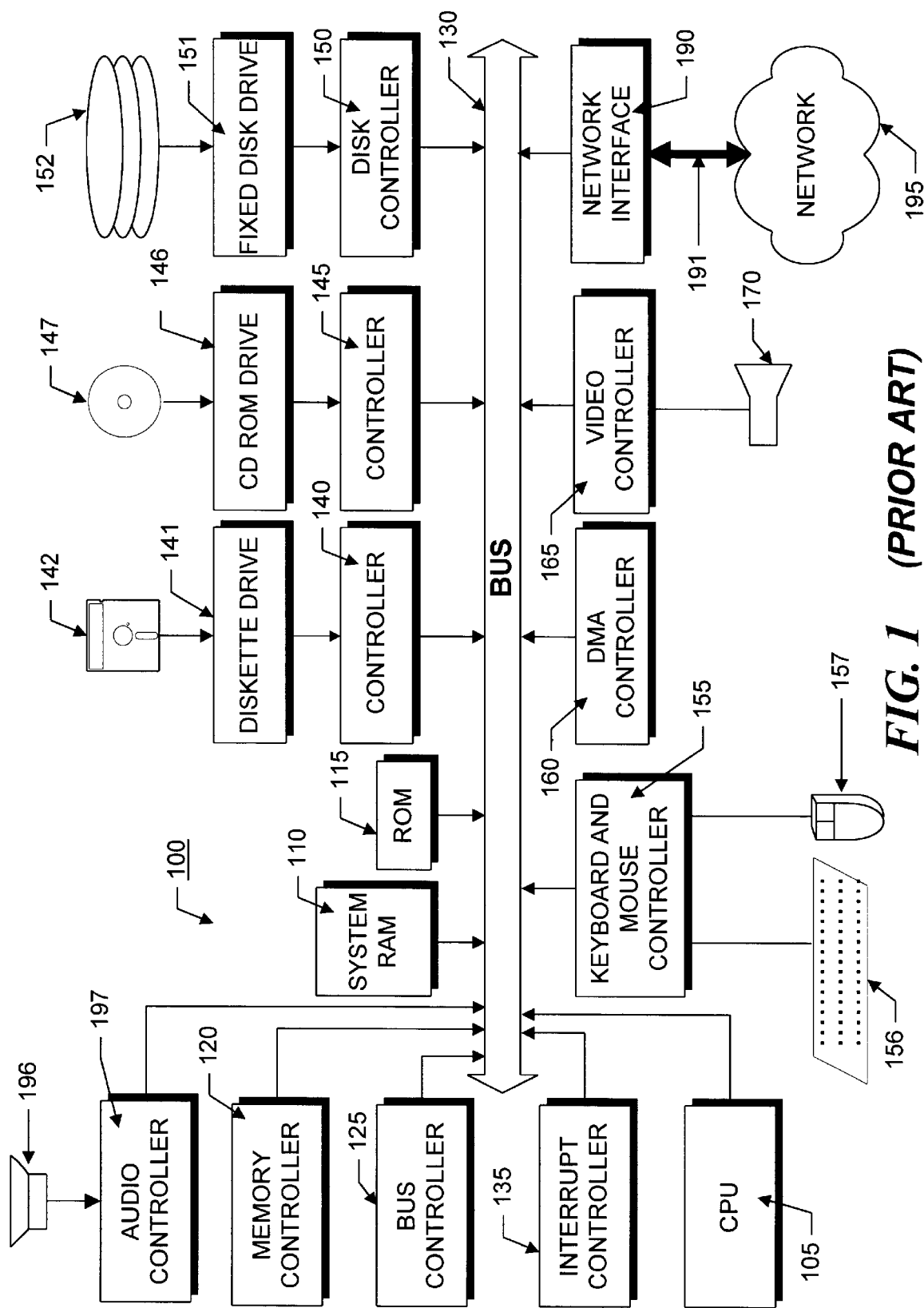
FIG. 1 is a schematic block diagram of a conventional computer system on which software programs embodying the invention can run.

FIG. 1 illustrates the system architecture for an exemplary client computer 100, such as an IBM THINKPAD 701® computer, on which the disclosed framework version communication system can be implemented. The exemplary computer system of FIG. 1 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 1.

The client computer 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with client computer 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the client computer 100 may be provided by a number of devices. For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to client computer 100 through bus 130 and an appropriate controller. DMA controller 160 is provided for performing direct memory access to system RAM 110. A visual display is generated by a video controller 165, which controls video display 170.

Client computer 100 also includes a network adapter 190 that allows the client computer 100 to be interconnected to a network 195 via a bus 191. The network 195, which may be a local area network (LAN), a wide area network (WAN), or the Internet, may utilize general purpose communication lines that interconnect multiple network devices.

The computer 100 is generally controlled and coordinated by operating system software, such as the SYSTEM 7® operating system, available from Apple Computer Corporation, Cupertino, Calif. or the AIX® operating system available from International Business Machines Corporation, Boca Raton, Fla. Conventional operating systems control and schedule computer processes for execution, perform memory management, provide file system, networking, and I/O services, and provide a user interface, such as a graphical user interface ("GUI"), among other things. User applications, such as editors and spread sheets, directly or indirectly, rely on these and other capabilities of the operating system.

In a preferred embodiment, the invention is implemented in the C++ programming language using object-oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and figures out according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

In addition, the preferred embodiment also uses a framework approach to application development. From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. There are many kinds of frameworks depending on the level of the system with which the developer is concerned and the kind of problem being solved. The types of frameworks range from application frameworks that assist in developing the user interface, to lower level frameworks that provide basic system software services such as communications, printing, file systems support, graphics, etc. Commercial examples of application frameworks are MacApp (Apple), Bedrock (Symantec), OWL (Borland), NeXTStep App Kit (NeXT), and Smalltalk-80 MVC (ParcPlace) to name a few.

In the same way that an application framework provides the developer with prefab functionality, system frameworks, such as those included in a preferred embodiment, leverage the same concept by providing system level services, which developers, such as system programmers, use to subclass/override to create customized solutions. A preferred embodiment of the instant invention is implemented as part of a system-level application framework. A system-level framework is part of the platform image and library set, rather than being compiled into the application image. In this fashion, applications executing on the system can share the use of the framework components, rather than having the framework components replicated in each application's image.

Figure 2:
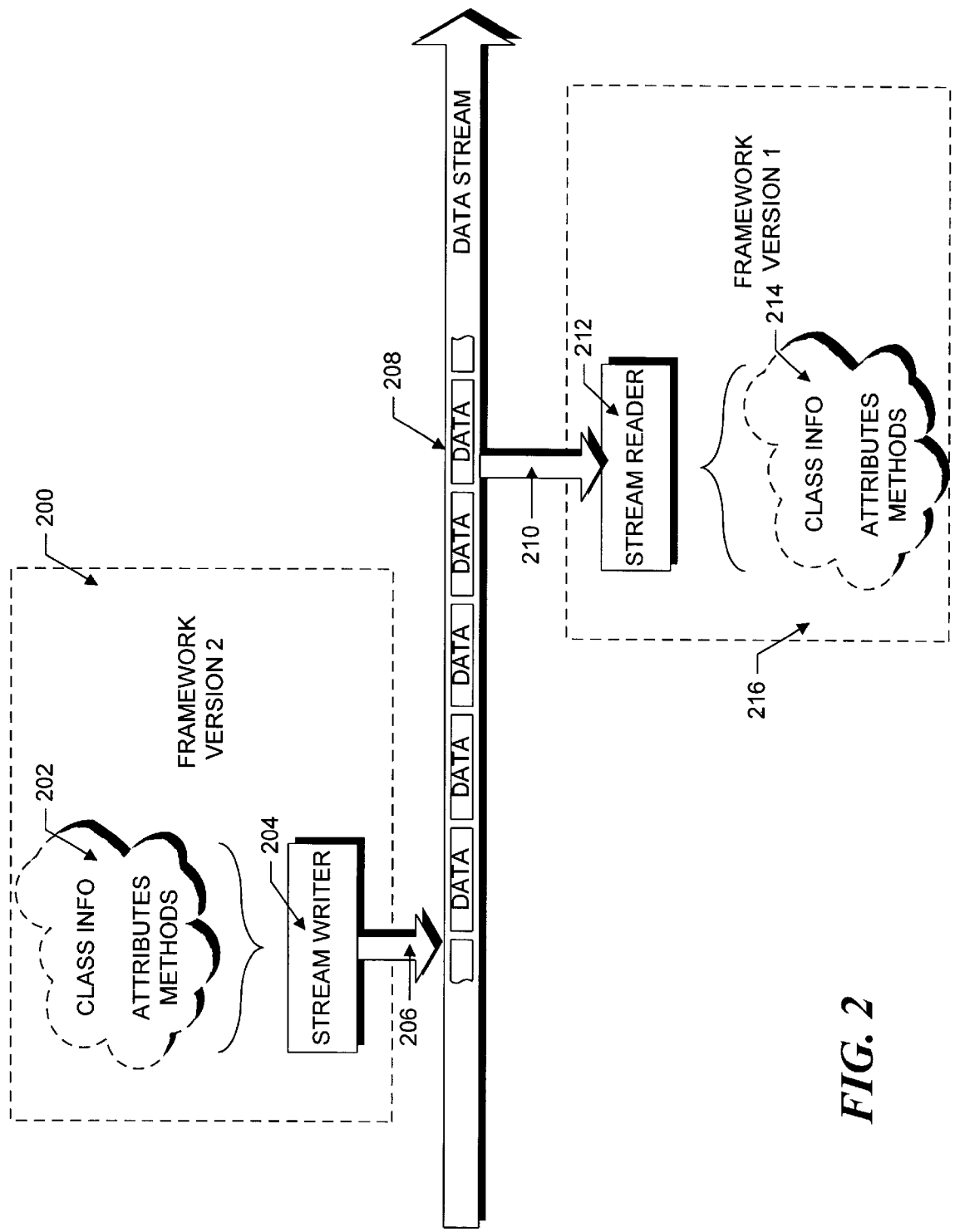
FIG. 2 is a block schematic diagram indicating the main elements involved in streaming object information from one application program to another.

FIG. 2 is a high level block schematic diagram which illustrates how object and class information is streamed, via a data stream, from one application program 200 constructed with a framework version 2 to another application program 216 constructed with a framework version 1. For example, object information in the form of class data 202 contains attributes and methods which are to be sent to application 216. The class information 202 is provided to a stream writer 204 which, in a well known fashion, serializes the data and places it on a data stream 208 as indicated schematically by arrow 206.

In the application program 216, the data is retrieved from the data stream 208 as indicated schematically by arrow 210 by a stream reader 212. The stream reader 212 uses the data on the data stream plus class information in the framework to construct a copy 214 of the original object information 202. The object class information is then used to construct a new object in the application program 216.

The operation of stream readers and writers, and data streams in general, is well-known to those skilled in the art. In the discussion, below a particular set of system frameworks called the Commonpoint™ System for the AIX® operating system, developed and sold by the International Business Machines Corporation, Armonk, N.Y., will be used as an example and code fragments illustrating the operation of the invention will be discussed relative to this system. The Commonpoint system is described in detail in a set of reference books entitled the Commonpoint Application System, Version B for AIX, Taligent, Inc. 1995, the contents of which are hereby incorporated by reference. The streaming functions discussed below are particularly discussed in a volume entitled Foundation Services. However, the inventive principles are not limited to use of the Commonpoint system and its use as an example should not be understood to limit the applicability of the invention to other systems.

Since the basic Commonpoint system is modified, as described below, in accordance with the principles of the present invention to accomplish data compatibility, a short decription of the existing Commonpoint streaming functions follows. In the Commonpoint system, the Write( ) function is the main function for writing data out to a data stream. It is indicated by the stream-out symbol ">>=" in the code fragments illustrated below and it writes data directly to the data stream. This function is only used when no pointers to other object instances are involved. When pointers must be streamed, then the polymorphic functions, Flatten( ) and Resurrect( ) are used to insure that the appropriate data is written.

The Commonpoint application system provides this global function for primitive data types, such as character, integer, etc. For example, the following code fragment shows how each stream type writes data. When the ">>=" function is used, it really calls the Write( ) function of the data stream.

```
long x = 5;        // sample data with known, primitive type
TFileStream f;     // sample data stream
x >> = f;          // executes f.Write(x)
```

In the Commonpoint system, the writers are designed to write out a "version number" associated with each object instance. The version numbers are updated whenever the external representation of the instance changes.

The Read( ) function is the main Commonpoint function for reading information in from a data stream. It is indicated by the stream-in symbol "<<=" in the code fragments illustrated below. The Read( ) function must read in data in the exact same order as the Write( ) function which wrote it out. For example, if objects a, b , and c have been written to a stream, then the reader must read the stream back in order into matching variables for a, b, and c, when reading the streamed objects back into a program's memory space. When the "<<=" function is used, it really calls the Read( ) function of the data stream. Using the same stream (TFileStream f) as used in the Write( ) example above, the following code shows how to read from a stream into a variable:

```
long y;        // create variable to read into
y << = f;      // do f.Read(y)
```

Where pointers and more complicated objects are involved the global Flatten( ) function must be used. Flatten( ) is more intelligent than the write( ) function because it follows every pointer and nested instance contained in the original instance being streamed. In addition, the Flatten( ) function maintains the correct instance structure when object instances are resurrected. If only pointers to instance are written to a data stream, then, during resurrection, the pointers will end up pointing to unknown data. This is considered a run-time error, because accessing the pointers will generate unknown results. To guarantee the resurrected information is exactly the same as the information that was flattened, all information about the instance is written to the stream.

In addition, the Flatten( ) function provides a default "context", which recognizes when more than one of the same object instance is present in the data to be streamed. By default, only the first instance is streamed out, and identification tokens are written for each similar instance streamed out after the first. Writing only the tokens achieves a reduction in the amount of data streamed, thereby creating efficiency through data compression. The code fragment below illustrates the use of the Flatten( ) function to flatten an object a:

TPersistentClassA* a=new TPersistentClassA('a', 5);
TFileStream aStream(new char[100], 100);
Flatten(a,aStream);

A TContext argument is used in the case where multiple references to the same object are flattened and packed together on the same stream. The TContext element is a dynamic dictionary built during the flattening process to assign references to repeated object instances from a set of objects to be saved. The code sample below shows multiple instance flattening techniques for flattening object instances d and a:

TPersistentClassA* a=new TPersistentClassA('a', 5);
TPersistentClassD* d=new TPersistentClassD("me", "cguy", "bguy", a);
TFileStream aStream(new char[100], 100);
TContext aContext;
if (!aStream-→GetContext( ))
    aStream-→SetContext(&aContext);
aStream.FlattenPointer(d);
aStream.FlaftenPointer(a);
if (aStream-→GetContext( )==&aContext)
    aStream-→SetContext(NIL);

The Resurrect( ) function takes the flattened form of an instance and creates an object instance from it. The Resurrect( ) function takes as parameters a stream identification and a context identification. The stream which is passed in to the Resurrect( ) function as a parameter contains the flattened form of the instance. The context which is passed in is used in the same manner as described with reference to the Flatten( ) function. The following code fragment illustrates the use of Resurrect( ) to reconstruct a single instance of an object A from a data stream, aStream:

TPersistentClassA* A;
TFileStream aStream;
A=(TPersistentClassA*) aStream.Resurrect( );

The following code fragment illustrates resurrecting two object instances of objects D and A from the same stream:

TPersistentClassD* D;
TPersistentClassA* A;
TFileStream aStream;
TContext aContext;
if (!aStream-→GetContext( ))
    astream-→SetContext(&aContext);
D=(TPersistentClassD*) aStream.Resurrect( );
A=(TPersistentClassA*) astream.Resurrect( );
if (aStream-→GetContext==&aContext)
    aStream-→SetContext(NIL);

The following fragment is a definition of a custom stream-out operator (>>=) which flattens the base classes of its instances by explicitly calling the Flatten routine of the base classes. It then flattens the member instances by explicitly calling the Flatten routine of the member instances. Finally, it flattens its member which are primitive data types and references to other instances. Simple data types are flattened by writing the data type to the stream using the stream write( ) member function. References to other instances are flattened by recursively calling the FlattenPointer( ) routine with the parameters that were passed in. In this example, it is assumed that class C is descended from classes A and B, has a member instance d of class D, has a member with a primitive type long, a member with a primitive type char, and a pointer to an E instance (e). The WriteVersion( ) function writes the object version number to the stream as described above. The function, and modifications made in accordance with the invention, are discussed in detail below.

The illustrative code fragment is as follows:

```
TStream& C::operator>>=(TStream* toWhere)
{
    WriteVersion(toWhere);
    A::operator>>=(toWhere);
    B::operator>>=(toWhere);
    d.operator>>=(toWhere);
    fLong >>= toWhere;
    fChar >>= toWhere;
    toWhere.FlattenPointer(e);
    return toWhere;
}
```

A customized stream-in operator (<<=) for resurrecting the object flattened by the above procedure is illustrated below. The ReadVersion( ) function is the counterpart of the WriteVersion( ) function which reads the version number. It is also discussed in detail below.

```
TStream& C::operator<<=(TStream* fromWhere)
{
    VersionInfo v = ReadVersion (fromWhere);
    if (v == kNewVersion)
    {
        A::operator<<=(fromWhere);
        B::operator<<=(fromWhere);
        d.operator<<=(fromWhere);
        fLong <<= fromWhere;
        fChar <<= fromWhere;
        e = (E*) fromWhere.Resurrect();
    }
    else
    {
        //read the old version
        ...
    }
    return fromWhere;
}
```

Overview

The overall issue of data compatibility between application programs constructed with different framework versions encompasses several sub issues. For example, data incompatibility can arise from mismatched class versions and from missing classes. There are also issues concerning data loss when incompatibilities are processed. Finally, there are issues concerning the reading of data streams by applications which were constructed without using any of the underlying framework versions.

1. Mismatched Class Versions

A mismatched class version problem arises when a stream reader finds an unknown version of a class on a stream. In particular, an unknown version generally appears as unknown extensions to a known class. In accordance with the principles of the invention, this problem is solved by allowing the stream reader to skip and, possibly discard, unknown extension data. In particular, the stream writers are modified, as set forth in detail below, to control the format in which class extensions are written.

In particular, the format for the original base class data is to write the version number, stream the base class data and then stream the derived class data as in the following example of a stream-out operator:

```
TStream& TClass::operator>>=(TStream& toWhere) {
    ::WriteVersion(kInitialVersion, toWhere);
    TSuperClass::operator>>=(toWhere);
    field00>>=toWhere;
    field01>>=toWhere;
    return toWhere;
};
```

The format for the stream-in operator is as follows:

```
TStream& TClass::operator<<=(TStream& fromWhere) {
    ::ReadVersion(kInitialVersion, kInitialVersion, fromWhere);
    TSuperClass::operator<<=(fromWhere);
    field00<<=fromWhere;
    field01<<=fromWhere;
    return fromWhere;
};
```

In addition, any future version of a class must add its extension fields in a group. The stream writer is modified to precede this group by the length of the group. This results in writing and reading the class information in the sequence illustrated in FIG. 3.

Figure 3:
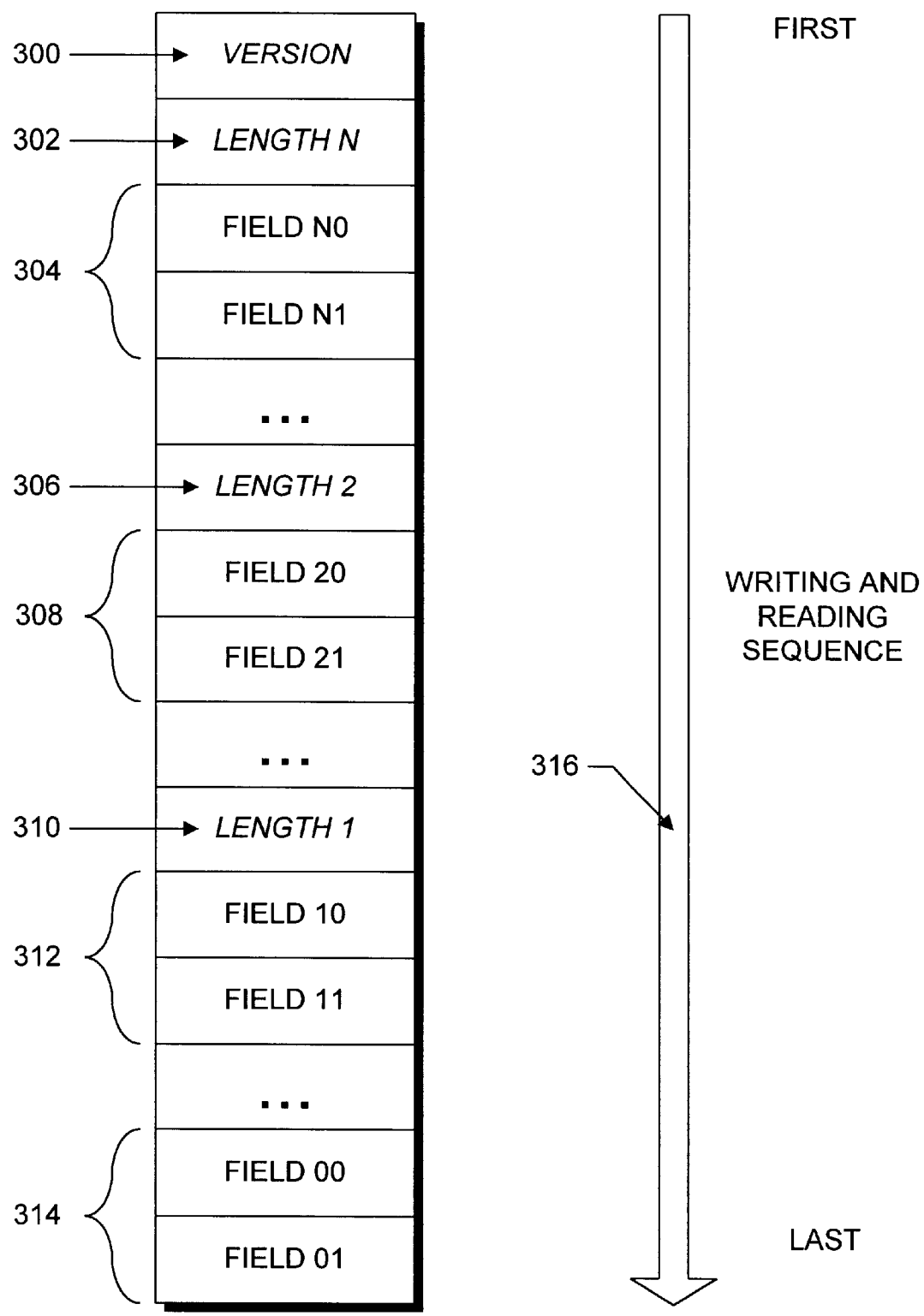
FIG. 3 is a schematic diagram of streamed class code for an object with extensions indicating how the class information is formatted, written and read.

FIG. 3 shows a class with N extensions written and read in the order indicated by arrow 316. When the class information is written to the stream, the version number 300 is written first, followed by the groups of extension fields. Each field group is preceded by the length of the group. For example, extension field group 304 is preceded by its group length 302. Group 308 is preceded by length 306 and group 312 is preceded by length 310, etc. The original class fields 314 are written last. The non-italicized fields indicate data that is specified or written to the stream by the object itself whereas the italicized fields indicate data that is written to the stream by streaming support code constructed in accordance with the principles of the invention. Note that the "newest" extensions are written first followed by "older" extensions. An illustrative stream-out operator for a class with two version extensions is as follows:

```
TStream& TClass::operator>>=(TStream& toWhere) {
    ::WriteVersion(kLatestVersion, 2, toWhere);
    //Write data for version 2.
    {   TExtensionOutputStream writeStream(toWhere, true);
        field20>>=writeStream;
        field21>>=writeStream;
    };
    //Write data for version 1
    {   TExtensionOutputStream writeStream (toWhere, true);
        field10>>=writeStream;
        field11>>=writeStream;
    };
    //Initial data.
    TSuperClass::operator>>=(toWhere);
    field00>>=toWhere;
    field01>>=toWhere;
    return toWhere;
};
```

The corresponding stream-in operator is as follows:

```
TStream& TClass::operator<<=(TStream& fromWhere) {
    VersionInfo version = ::ReadVersion(kInitialVersion, kLatestVersion, fromWhere);
```

```
        if (version >=2){
            //Read data for version 2.
            TExtensionInputStream readStream(fromWhere);
            field20 <<=readStream;
            field21 <<=readStream
        }else {
            //Default the version 2 data.
            field20=fallbackValue20;
            field21=fallbackValue21;
        }
        if(version >=1) {
            //Read data for version 1.
            TExtensionInputStream readStream(fromWhere);
            field10<<=readStream;
            field11<<=readStream;
        }else {
            //Default the version 1 data.
            field10=fallbackValue10;
            field11=fallbackValue11;
        }
        //Initial data.
        TSuperClass::operator<<=(fromWhere);
        field00<<=fromWhere;
        field01<<=fromWhere;
        return fromWhere;
};
```

When reading the stream, an earlier framework version reader reads the version number and then uses the lengths to skip extension fields until it gets to an extension it understands. It can either discard the skipped extensions or save them in a temporary storage called a "bit bucket" for use when streaming out the class as described below.

One drawback of this approach is that the stream writer cannot predict the length of an extension group before writing each extension. On a random-access stream, this means that the system has to back-up, write the length, then reset. This may involve flushing file buffers multiple times if the data crosses buffer boundaries. On a non-random access stream, this means that the system has to write the extension data to an in-memory stream and then write the length and copy the in-memory stream to the main stream. This may have a significant performance and memory impact. To mitigate this impact, the compatibility support described below only wraps extensions only if it is absolutely necessary. If the stream is not persistent then the extension-wrapping code does nothing.

2. Missing Classes

A missing class data compatibility problem occurs when a stream reader finds an unknown class on the stream. In some cases, stream writers do not indicate the ends of streamed objects, as is the case with the aforementioned Commonpoint system. Therefore, the stream reader is unable to skip the unknown object and any stream which contains an unknown class is unreadable from that class onward.

This can be a problem for both forward and backward data compatibility. Obviously, there may be unknown classes on streams from newer framework versions because the newer framework versions contain new classes. But new framework versions may not recognize some of the classes on streams from old framework versions if some of the old classes have been deleted. To avoid the latter problem, persistent classes are not deleted from the old framework versions.

There is still a problem with new classes, but fortunately, not all new classes have the potential to cause a problem. Problems occur for new classes that descend from existing classes, and only when those new classes are streamed polymorphically. For example, assume that an old framework version has a text style called TTextStyle and a new framework version introduces a new text style: TWavyUnderlineStyle, which descends from TTextStyle. In the new framework, the TWavyUnderlineStyle could be streamed monomorphically either by a new class or it could be streamed monomorphically by a new extension of an old class. However, it could not be streamed monomorphically by the base version of the old class since the TWavyUnderlineStyle does not exist in the old framework version. Since the TWavyUnderlineStyle cannot be streamed by the base version of an old class, and, since that is the only version that is read by the old framework streaming functions, no old framework will ever see a monomorphic TWavyUnderlineStyle. So the missing class problem can never happen for monomorphically streamed classes.

However, an old framework reader might encounter a TWavyUnderlineStyle that was streamed polymorphically. For example, assume that there is an old class called TStyleBundle that streams text styles polymorphically. In the new framework, the TStyleBundle class might contain a TWavyUnderlineStyle. If a TStyleBundle containing a TWavyUnderlineStyle is streamed by an application program built with the new framework, and that stream is read by an application built with the old framework, the old TStyleBundle class stream-in operator will attempt to resurrect an old TTextStyle. Since the old TTextStyle has been replaced by a TWavyUnderlineStyle, the resurrection will fail.

In accordance with the principles of the present invention, the stream writers are modified so that they write an "alternate" old class when every new class that descends from an existing class is streamed. Each of the alternates, including the original class, is wrapped like an extension with the length at the beginning. This results in writing and reading the class information in the sequence illustrated in FIG. 4.

Figure 4:
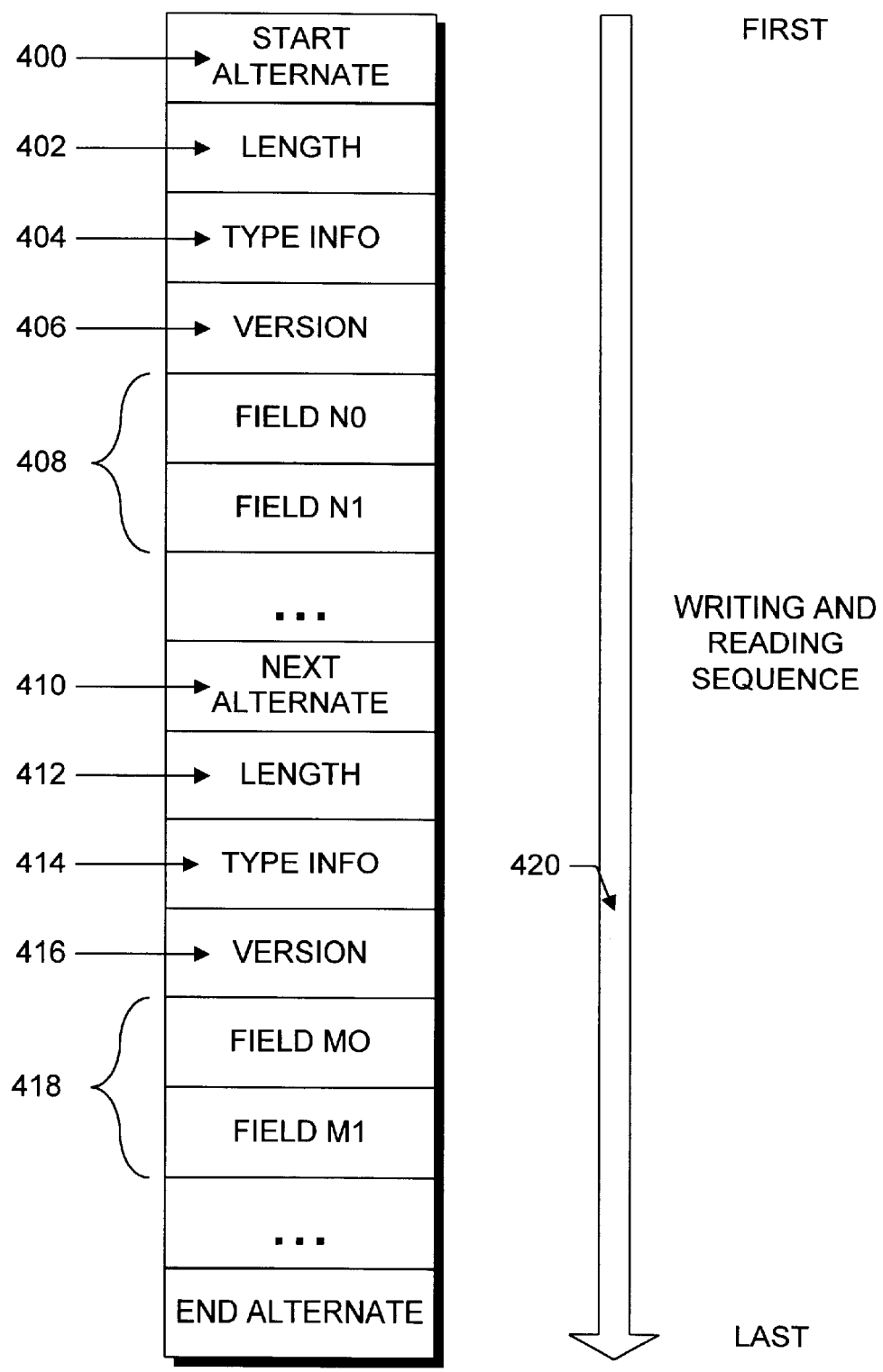
FIG. 4 is a schematic diagram of streamed class code for an object with alternates indicating how the class information is formatted, written and read.

FIG. 4 shows a class with an alternate written and read in the order indicated by arrow 420. When the class information is written to the stream, the start alternate name 400 is written first. The start alternate is the original class information. The information for each alternate is preceded by the length of the alternate. For example, the length 402 of the start alternate 400 precedes the information for that alternate. Type information 404 is written next and the alternate version number 406 is written next, followed by a group 408 of alternate fields.

In a similar manner, the next alternate 410 comprises a name 410 followed by length 412, type info 414 and a group of fields 418. The non-italicized fields indicate data that is specified or written to the stream by the object itself whereas the italicized fields indicate data that is written to the stream by streaming support code constructed in accordance with the principles of the invention. As with the extensions, the "newest" alternates are written first followed by "older" alternates. Then, stream readers that don't understand the first alternate can use the length to skip it. They can then read subsequent alternates until they reach one that they understand. Skipped alternates may be discarded or may be saved in a bit bucket. If the stream reader does not understand any of the alternates, the inventive Resurrect( ) function will skip all of the alternates and throw an exception. Application programs that can catch this exception may then proceed to read the rest of the stream.

Illustrative code fragments showing stream-in and stream-out operators for classes with alternates are as follows:

```
TStream& TClass::operator>>=(TStream& toWhere) {
        TAlternateOutputStream   altStream(toWhere);
        //Write the stream.
        ::WriteVersion(kLatestVersion, 2, altStream);
        {       TExtensionOutputStream writeStream(altStream, true);
                field 20>>=writeStream;
                field 21>>=writeStream;
        };
        {       TExtensionOutputStream writeStream(altStream, true);
                field10>>=writeStream;
                field11>>=writeStream;
        };
        TSuperClass::operator>>=(altStream);
        field00>>=altStream;
        field01>>=altStream;
        //Write the alternate
        if (altStream PrepareForNextAlternate()) {
                //Intialize and flatten the 1.0 alternate.
                TSomeRelated 1.0Class     altClass (...);
                ::Flatten(&altClass, altStream);
        }
        return to Where;
};
TStream&TClass::operator<<=(TStream&fromWhere) {
        TAlternateInputStream      altStream(fromWhere);
        VersionInfo version = ::ReadVersion(kInitialVersion, kLatestVersion, altStream);
        if (version >=2 {
                //Read data for version 2.
                TExtensionInputStream readStream(altStream);
                field20<<=readStream;
                field21<<=readStream;
        } else {
                // Default the version 2 data.
                field20=fallbackValue20;
                field21=fallbackValue 21;
        }
        if (version >=1){
                //Read data for version 1.
                TExtensionInputStream readStream(altStream);
                field10<<=readStream;
                field11<<=readStream;
        } else {
                //Default the version 1 data.
                field10=fallbackValue10;
                field11=fallbackValue11;
        }
        //Initial data.
        TSuperClass::operator<<=(altStream);
        field00<<=altStream;
        field01<<=altStream;
        return fromWhere;
};
```

One drawback to this solution is that the alternates will slow down the streaming operators and increase the size of the stream. Writing the stream takes longer because the alternate class has to be constructed, initialized and streamed, and the stream is larger because it contains the alternate data. To mitigate this cost, the compatibility support code disclosed below only writes alternate data if it is absolutely required. If the object is not persistent, or if the object is not being streamed polymorphically, then no alternate data will be written.

The form of the streaming operators which use alternates is as follows:

```
TStream& TNewClass::operator>>=(TStream& toWhere)
{
        TAlternateOutputStream      altStream(toWhere);
        //Stream myself--follow the recommended format.
        WriteVersion(KinitialVersion, altStream);
        TSuperClass::operator>>=(altStream);
        fData1>>=altStream;
        ...
        //PrepareForNextAlternate will return TRUE only if an alternate is required.
        if (altStream.PrepareForNextAlternate()) {
                //Initialize and flatten the old framework alternate class.
                TSomeRelatedOldClass      altClass(...);
```

-continued

```
            ::Flatten(&altClass, altStream);
        }
        return toWhere;
}
TStream& TNewClass::operator<<=(TStream& fromWhere)
{
        TAlternateInputStream    altStream(fromWhere);
        //Stream myself--follow the recommended format.
        ReadVersion(kinitialVersion, kinitialVersion, altStream);
        TSuperClass::operator<<=(altStream);
        fData1 <<=altStream;
        ...
        return fromWhere;
}
```

Under some circumstances it may be desirable for a particular application program to supplement or override the alternates for a class. In this case a function, FlattenWithoutAlternates( ) is used to do this. FlattenWithoutAlternates( ) puts the given object on the stream without any of its alternates. The following code fragment illustrates how an application can use the FlattenWithoutAlternates( ) to override an object's default alternates and supply a special alternate stream. This example assumes the application wants to stream a type of object called an MGraphic and wants to provide its own alternate object.

```
for each MGraphic* g{
        //Create special alternate stream
        TAlternateOutputStream    altStream(toWhere);
        //Stream the MGraphic--but not any of its alternates.
        FlattenWithoutAlternates(g, altStream);
        if (altStream.PrepareForNextAlternate()) {
                //Now flatten the special alternate.
                Flatten(myAlternateObject, altStream);
        }
}
```

3. Avoiding Data Loss

The aforementioned data compatibility support allows stream readers to skip streamed extensions and alternates that they do not understand. This can result in data loss when streams are exchanged between sites. For example, suppose user 1 and user 2 are collaborating on a document that contains an extended graphic object. The object is a polygon, but in a new framework, it has been extended to include a curve. User 1 is using an application program built with the new framework, but user 2 is using a program built with an old framework version. User 1 edits the object, introducing curve edits and streams the object to user 2. User 2's old stream reader discards the unknown curve data and presents the polygon to user 2. User 2 edits the polygon, and streams the polygon back to user 1, but user 1's curve edits have been lost. To avoid this kind of data loss, the inventive system provides "bit bucket" classes that can be used to capture and preserve unread stream data.

To preserve unread extension data the inventive system provides a TExtensionBitBucket class. In use, a TExtensionBitBucket object is passed to the ReadVersion( ) function, described above, which will deposit skipped extensions into it rather than discarding them. The information is then temporarily saved. A TExtensionBitBucket object can also be passed to the WriteVersion( ) function, which will write the saved contents to the stream. However, the application program must decide whether or not to write the saved information to the stream. If the base object has not changed, then clearly it is safe to write out the saved information. But if the base object has changed, then the saved information might be inconsistent with the new object. To help the client to decide whether or not to write the saved information, a TExtensionBitBucket object maintains an "orthogonal" flag. This flag indicates whether the saved data contained in the object is affected by, or independent of (orthogonal), to the base data. If the flag is TRUE, then the saved data will be consistent with the base object no matter how the base object has changed.

The BitBucket objects can be used in the example above. If the developer of the new framework suspects that the polygon class may be extended in the future, a TExtensionBitBucket class can be included in the places where the polygon class is streamed. The resulting BitBucket object will catch future extensions of the class. When the polygon object is extended to include the curve, the polygon's streaming operators are also extended to read and write the curve. In the stream-out operator for the polygon class, the developer sets the flag that indicates that the curve data is orthogonal to the polygon data.

So now, when user 1 streams the polygon to user 2, the extra curve data is not discarded. Instead, the revised code saves it in a bit bucket. User 2 edits the polygon, and then sends it back to user 1. When user 2 streams the polygon data, the stream writer also streams the saved data because the orthogonal flag is set to TRUE. User 1 then receives the edited curve data back, plus the polygon data as edited by user 2 and the work of both users is preserved.

To preserve unread alternate class data, the inventive system provides a TAlternateBitBucket class. During use, the application program can pass a TAlternateBitBucket object to the Resurrect( ) function, which will dump all of the unread alternates into it. An application program can also pass a TAlternateBitBucket object to the Flatten( ) function, which will write out the alternates with the flattened class.

The TAlternateBitBucket class is used in the same way as the TExtensionBitBucket class. However, using default alternates may be difficult with complex collaboration scenarios. Edits to alternate objects are not know by all systems and, therefore, difficulties can arise.

In accordance with one illustrative embodiment, a data compatibility system consists of several extensions to the conventional Commonpoint streaming architecture. The data compatibility system extends the streaming architecture by introducing stream wrappers, bit buckets and enhanced streaming support functions. Some of the stream wrapper classes are public and are available to developers. Others are private and used to implement various internal functions.

The function of several stream wrapper classes, including TAlternateInputStream, TAlternateOutputStream, TExtensioninputStream and TExtensionOutputStream, is to wrap the stream and filter streamed data. For example, TExtensionOutputStream makes sure that every class extension field group is preceded on the stream by its length, and TAlternateOutputStream discards alternates that are not needed. These classes are available to developers because they are intended to be used to support data compatibility. The complete class hierarchy for the public and private streaming classes is shown in FIGS. 5 and 6.

of ordinary skill in the art and will not be described or explained herein. The interpretation of the Booch diagrams and notations are explained in a text book published by The Benjamin/Cummings Publishing Company, Inc. entitled Object-Oriented Analysis and Design with Applications by Grady Booch, which is hereby incorporated herein by reference.

Public Stream Wrapper Classes

Figure 5:
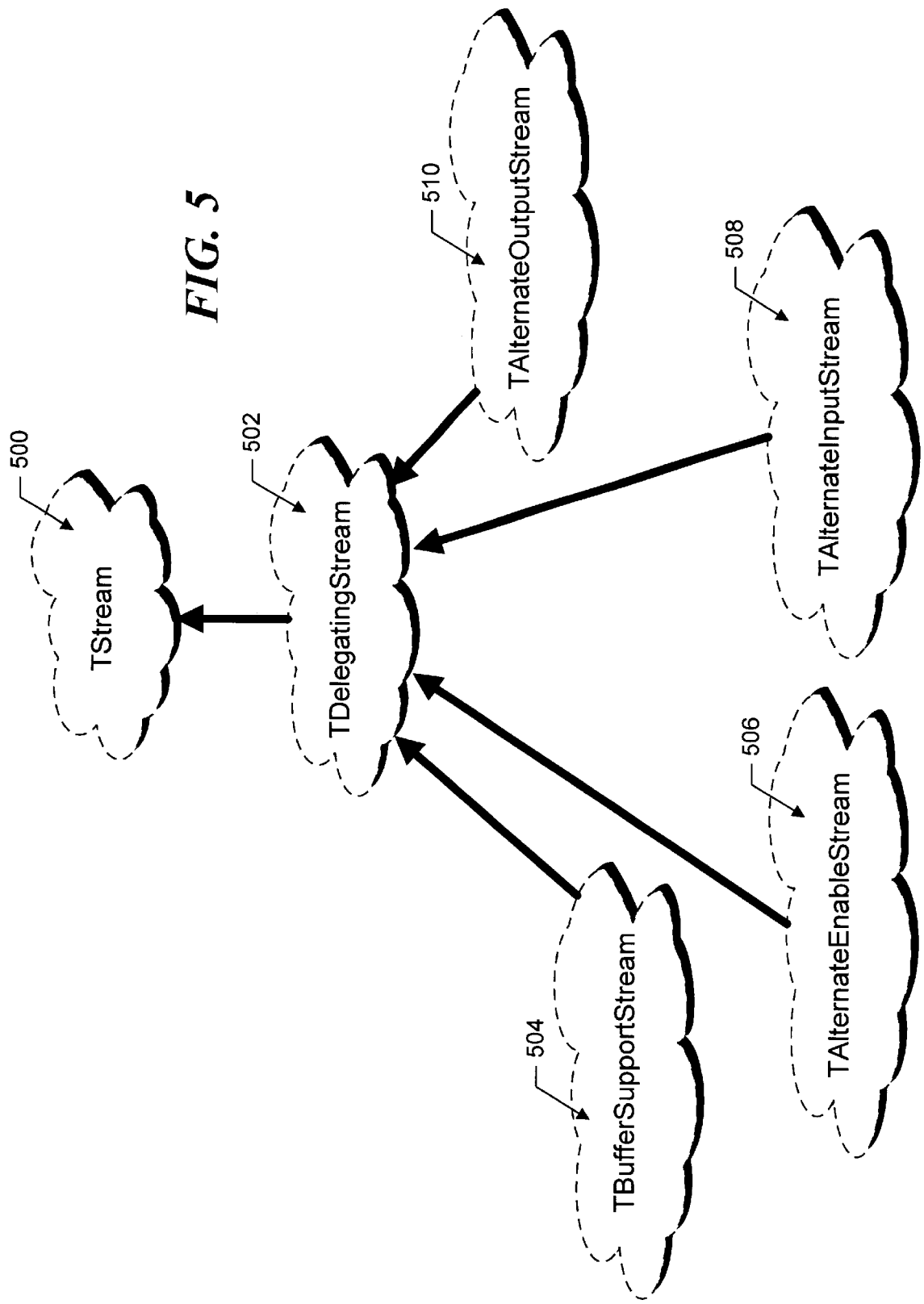
FIG. 5 is a class hierarchy diagram of the inventive streaming support classes.
Figure 6:
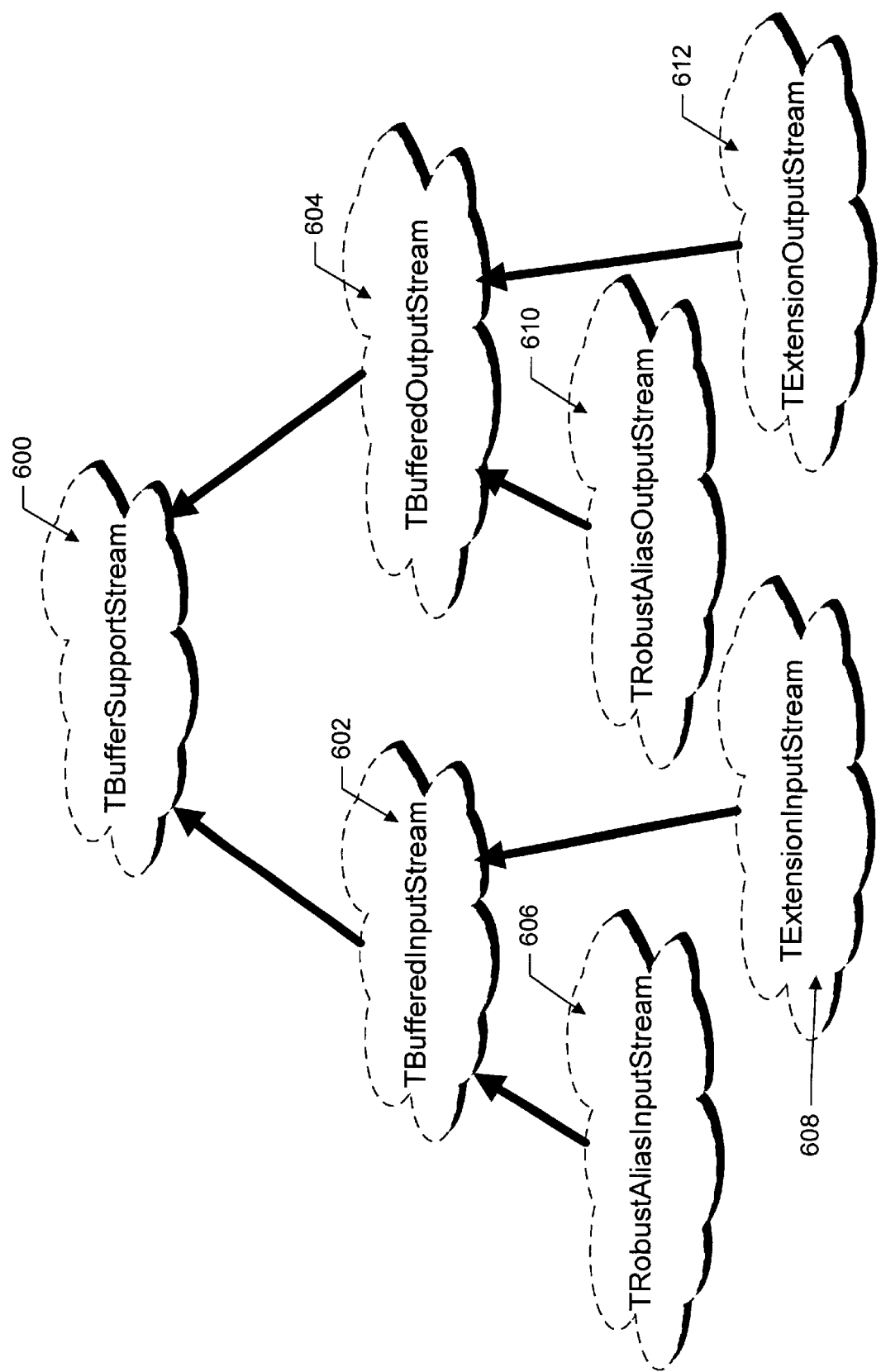
FIG. 6 is a more detailed class hierarchy diagram of the inventive streaming support classes which descend from the TBufferSupportStream class.

Referring to FIG. 5, the TDelegatingStream class 502 is an abstract stream class which descends from the abstract class TStream 500 and delegates to another stream. It passes all stream calls though the destination stream. It has the following class declaration:

```
class TDelegatingStream : public TStream {
    public:
        TDelegatingStream();
        TDelegatingStream(TStream* streamToAlias);
        virtual       ~TDelegatingStream();
        TStream*      GetStream() const;
        virtual void  SetStream(TStream* streamToAlias);
        virtual TStream& operator>>=(TStream& toWhere) const;
        virtual TStream& operator>>=(TStream& fromWhere);
    protected:
        virtual void SyncDestinationStream();         //Write flags to the
                                                      destination stream.
        virtual void SyncDestinationStreamBuffers();  //Write buffered data to
                                                      destination stream.
        virtual void SyncToDestinationStream();       //Update flags from the
                                                      destination stream.
        virtual void SyncToDestinationStreamBuffers();//Update buffers
                                                      from the destination
                                                      stream.
    private:
        TDelegatingStream (const TDelegatingStream&);
        const TDelegatingStream& operator==(const TDelegatingStream&);
        TStream*      fDestinationStream;
    public:
        //All stream operations are pass-through to fDestinationStream...
}
```

The TAlternateInputStream class 508 defines a delegating stream for reading alternates. It works in tandem with the Resurrect( ) function to read a stream containing alternates. It returns the first known alternate and skips all others. The TAlternateInputStream class 508 is not meant to be subclassed. Its declaration is as follows:

```
class TAlternateInputStream : public TDelegatingStream {
    public:
        TAlternateInputStream()
        TAlternateInputStream(TStream* streamToAlias);
        virtual  ~TAlternateInputStream();
        virtual TStream& operator>>=(TStream& toWhere) const;
        virtual TStream& operator>>=(TStream& fromWhere);
    private:
        TAlternateInputStream (const TAlternateInputStream&);
        TAlternateInputStream& operator=(const TAlternateInputStream&);
        bool fEnabled;
        TBufferedOutputStream* fBufferedOutputStream;
}
```

FIGS. 5 and 6 are a series of so-called Booch class diagrams illustrating classes which form a variety of different frameworks. Each of the classes and the relationships therebetween will be discussed in detail below. The Booch diagrams and notations used therein are well known to those The TAlternateOutputStream class 510 defines a designating stream for streaming out alternates. It supports a PrepareForNextAlternate( ) method which can be used to determine whether or not the stream requires alternates. TAlternate OutputStream class 510 is not meant to be subclassed. Its declaration is as follows:

```
class TAlternateOutputStream : public TDelegatingStream {
        public:
                TAlternateOutputStream();
                TAlternateOutputStream(TStream* streamToAlias);
                virtual ~TAlternateOutputStream();
                bool PrepareForNextAlternate();    //Prepare for the next alternate.
                                                   //Returns TRUE if an alternate is
                                                   //required; FALSE otherwise.
                virtual TStream& operator>>=(TStream& toWhere) const;
                virtual TStream& operator>>=(TStream& fromWhere);
        private:
                TAlternateOutputStream (const TAlternateOutputStream&);
                TAlternateOutputStream& operator=(const TAlternateOutputStream&);
                bool        fEnabled;
                TBufferedOutputStream* fBufferedOutputStream;
                TStream*    fOriginalStream;
}
```

```
class TBufferSupportStream : public TDelegatingStream {
        public:
                enum EStreamType {
                        kNIL,          // NIL stream pointer
                        kLocal,        //Non-persistent stream
                        kRandom,       //Random access persistent stream
                        kSequential    //Sequential persistent stream
                };
                TBufferSupportStream();
                TBufferSupportStream(TStream* streamToAlias);
                virtual ~TBufferSupportStream();
                virtual void SetStream(TStream* streamToAlias);
                EstreamType        GetStreamType() const;
                virtual TStream& operator>>=(TStream& toWhere) const;
                virtual TStream& operator>>=(TStream& fromWhere);
        private:
                TBufferSupportStream (const TBufferSupportStream&);
                TBufferSupportStream& operator=(const TBufferSupportStream&);
                void        ClassifyStream();
                EStream Type fStreamType;
}
```

The classes descended from the TBufferSupportStream class 504 are illustrated in FIG. 6. The TBufferedInput Stream class 602 implements an input stream which buffers its data. It is a delegating stream that stores streamed data in a virtual buffer instead of reading it directly from the stream. The TBufferedInputStream class accepts a stream header object that maintains statistics about the buffered data. When reading the wrapped data from the stream, it first reads the header data from the stream before go any of the buffered data. The TBufferedInputStream class 602 also provides a method to skip the wrapped data without reading it from the stream. Its declaration is as follows:

The TBufferSupportStream class 504 is an abstract stream wrapper which supports buffered input and output streams. It classifies the wrapped stream as being NIL, non-persistent with random access or persistent with sequential access. Its declaration is as follows:

```
class TBufferedInputStream : public TBufferSupportStream {
        public:
                TBufferedInput Stream();
```

-continued

```
            TBufferedInput Stream(TStream* streamToAlias, TStreamHeader*
                       headerToAdopt, TVirtualContext* vcToAdopt);
            virtual      ~TBufferedInputStream();
            virtual void SetStream(TStream* streamToAlias);
            virtual void SetFreezeLevel(FreezeLevel theFreezeLevel);
            virtual void SkipBufferedInputData();
            const TStreamHeader*    GetHeader() const;
            virtual TStream& operator>>=(TStream& toWhere) const;
            virtual TStream& operator>>=(TStream& fromWhere);
    private:
            TBufferedInput Stream (const TBufferedInput Stream&);
            TBufferedInputStream& operator = const TBufferedInput Stream&);
            void SetupBuffer();
            void CleanupBuffer();
            TRandomAccessStream*  fLocalStreamPtr;
            TVirtualContext*      TVirtualContext;
            TStreamHeader*        header;
            TStreamHeader*        fNewHeader;
            TBufferSupportStream::EStreamType fOriginalStreamType;
}
```

The TBufferedOutputStream class 604 implements an output stream which buffers its data. It is a delegating stream that stores streamed data in a virtual buffer instead of writing it directly to the stream. TBufferedOutputStream class 604 accepts a stream header object that maintains statistics about the buffered data. When writing the wrapped data to the stream, it first streams the header and then streams the buffered data. The TBufferedOutputStream class 604 also provides a method to dump wrapped data without writing it to the stream. Its declaration is as follows:

```
class TBufferedOutputStream : public TBufferSupportStream {
        public:
                TBufferedOutputStream();
                TBufferedOutputStream(TStream* streamToAlias, TStreamHeader*
                            headerToAdopt, TVirtualContext* vcToAdopt);
                virtual     ~TBufferedOutputStream();
                virtual void   SetStream(TStream* streamToAlias);
                virtual void   SetFreezeLevel(fFreezeLevel  the FreezeLevel);
                virtual void   SetHeader(TStreamHeader*  headerToAdopt);
                const TStreamHeader*    GetHeader()const;
                virtual void SetVirtualContext(TVirtualContext* vcToAdopt);
                const TVirtualContext*   GetVirtualContext() const;
                virtual TStream& operator>>=(TStream& toWhere) const;
                virtual TStream& operator>>=(TStream& fromWhere);
        private:
                TBufferedOutputStream (const TBufferedOutputStream&);
                TBufferedOutputStream& operator=(const TBufferedOutputStream&);
                void SetupBuffer();
                void CleanupBuffer();
                TStream*              fSavedStream;
                TRandomAccessStream*  fLocalStreamPtr;
                TVirtualContext       TVirtualContext;
                TStreamHeader*        header;
                StreamPosition        fHeaderPosition;
                TBufferSupportStream::EStreamType    fOriginalStream type;
}
```

The TExtensionInputStream class 608 defines a buffered input stream for streaming in extensions. It supports an IsOrthogonal method which tells whether or not the extension is orthogonal to previous data. Its declaration is as follows:

```
class TExtensionInputStream : public TBufferedInputStream {
        public:
                TExtensionInputStream()
                TExtensionInputStream(TStream* streamToAlias);
                virtual ~TExtensionInputStream();
                bool  IsOrthogonal() const;
                virtual TStream& operator>>=(TStream& toWhere) const;
                virtual TStream& operator>>=(TStream& fromWhere);
        private:
```

-continued

```
        TExtensionInputStream (const TExtensionInputStream&);
        TExtensionInputStream& operator = (const TExtensionInputStream&);
}
```

The TExtensionOutputStream class 612 defines a buffered output stream for writing extensions. It has the following declaration:

```
class TExtensionOutputStream : public TBufferedOutputStream {
    public:
        TExtensionOutputStream();
        TExtensionOutputStream(TStream* streamToAlias, bool orthogonal =
                FALSE);
        virtual ~TExtensionOutputStream();
    private:
        TExtensionOutputStream (const TExtensionOutputStream&);
        TExtensionOutputStream& operator=(const TExtensionOutputStream&);
}
```

Public Bit Bucket Classes

The data compatibility support code also includes bit bucket classes which can be used to preserve unread stream data. Applications pass bit bucket objects to the ReadVersion( ) and Resurrect( ) functions to capture skipped extensions and alternates, and applications pass the filled bit buckets to the WriteVersion( ) and Flatten( ) functions to stream the saved data.

There are two bit bucket classes, TAlternateBitBucket and TExtensionBitBucket, and they are both unrooted (neither descends from another class.) Their implementations are not public. The TAlternateBitBucket class constructs an object which captures unread alternates. Applications can pass a-TAlternateBitBucket object to the Resurrect( ) function, and the Resurrect( ) function will fill it with all of the alternates that it skips. Applications can also pass a TAlternateBitBucket object to the Flatten( ) function which will stream the saved alternates instead of the regular alternates for the flattened object. A TAltemateBitBucket object preserves the order of the alternates, so they can be written in the same order that they were read. The TAlternateBitBucket class is not meant to be subclassed. It has the following declaration:

```
class TAlternateBitBucket {
        public:
                TAlternateBitBucket();
                TAlternateBitBucket(const TAlternateBitBucket&);
                virtual ~TAlternateBitBucket();
#ifndef NO__Internal
                void ReadPriorAlternate(TStream&);
                void ReadSubsequentAlternate(TStream&);
                void WriteAllPriorAlternates(TStream&);
                void WriteAllSubsequentAlternates(TStream&);
#endif
                TAlternateBitBucket&    operator=(const TAlternateBitBucket&);
        private:
#ifndef NO__Internal
                class TStreamedObjectAlternate {
                        public:
                                TStreamedObjectAlternate();
                                virtual ~TStreamedObjectAlternate();
                                // Streaming operators
                                virtual TStream&    operator>>=(TStream&);
                                virtual TStream&    operator<<=(TStream&);
                        private:
                                TAlternateStreamHeader header,
                                char*      fData;
                }
                TArrayOf<TStreamedObjectExtension> fPriorAlternates;
                TArrayOf<TStreamedObjectExtension> fSubsequentAlternates;
#endif
}
```

The TExtensionBitBucket class constructs an object which captures unread extensions. Applications can pass a TExtensionBitBucket object to the ReadVersion( ) function, and the ReadVersion( ) function will fill the object with all of the skipped extensions. Applications can also pass a filled TExtensionBitBucket object to a WriteVersion( ) function, and the WriteVersion( ) function will stream the saved extensions. A TExtensionBitBucket object maintains a flag which indicates whether or not the extension data it contains is independent of the other stream data for that class. The TExtensionBitBucket class is not meant to be subclassed and is defined as follows:

```
class TExtensionBitBucket {
        public:
                TExtensionBitBucket();
                TExtensionBitBucket (const TExtensionBitBucket&);
                virtual ~TExtensionBitBucket();
                bool IsOrthogonal() const;
#ifndef NO_Internal
                void ReadExtensions (long count, TStream&);
                void WriteExtensions(TStream&),
                long GelExtensionCount() const;
#endif
                TExtensionBitBucket& operator = (const TExtensionBitBucket&);
        private:
#ifndef NO_Internal
                class TStreamedObjectExtension {
                        public:
                                TStreamedObjectExtension();
                                virtual ~TStreamedObjectExtension();
                                //Streaming operators
                                virtual TStream& operator>>=(TStream&);
                                virtual TStream& operator<<=(TStream&);
                        private:
                                TExtensionStreamHeader header;
                                char*   fData;
                }
                TArrayOf<TStreamedObjectExtension>fExtensions;
#endif
}
```

Streaming Support Functions

The existing Commonpoint framework provides global functions for monomorphic and polymorphic streaming and stream format version handling as discussed above. The inventive data compatibility system extends these functions to accept bit buckets, handle alternates and deal with the other new compatibility features.

For example, the conventional ReadVersion( ) function and the WriteVersion( ) function allow applications to read and write stream format version numbers and have the following form:

```
void ReadVersion(Tstream& fromWhere, const VersionInfo oldestSupportedVersion,
                        const VersionInfo newestSupportedVersion);
void WriteVersion(TStream& toWhere, const VersionInfo version,
                        long extensionCount = 0);
```

A data compatibility system constructed in accordance with the principles of the present invention, modifies the ReadVersion( ) function and the WriteVersion( ) function to handle bit buckets for saving and writing extra extension data. These new functions have the form:

```
void ReadVersion(TStream& fromWhere, const VersionInfo oldestSupportedVersion,
                             const VersionInfo newestSupportedVersion,
                             TExtensionBitBucket& bucket);
void WriteVersion (TStream& toWhere, const VersionInfo version,
                             long extensionCount, const TExtensionBitBucket& bucket);
```

The conventional Flatten( ) and Resurrect( ) functions in the Commonpoint framework do polymorphic streaming as described above and have the following form:
template<classAType>
void Flatten (const AType* objPtr, TStream& toWhere);
template<classAType>
void Resurrect(AType&* newObj, TStream& fromWhere);

The inventive data compatibility system adds versions of the Flatten( ) and Resurrect( ) functions that accept bit buckets for saving and writing alternates. These new versions have the following form:

```
template<classAType>
void Flatten(const Atype* objPtr, TStream& toWhere,
                             const TAlternateBitBucket& bucket);
template<classAType>
void Resurrect(AType&* newObj, TStream& fromWhere, TAlternateBitBucket& bucket);
```

The inventive data compatibility system also adds versions of the Flatten( ) function which flatten objects without their alternates. These versions have the following form:

```
template<classAType>
    void FlattenWithoutAlternates(const AType* objPtr, TStream& toWhere);
template<classAType>
    void FlattenWithoutAlternates(const AType* objPtr, TStream& toWhere,
                             const TAlternateBitBucket& bucket);
```

Private Stream Wrapper Classes

The inventive data compatibility system also extends the streaming architecture by enhancing contexts, streams and the streaming support functions and introducing virtual contexts, stream wrappers, stream wrapper headers and bit buckets. Many of these enhancements are necessary to preserve reference information on the stream when some of the referenced objects are not recognized by the stream reader.

In particular, each stream has a default context. The context stores references to streamed objects. Whenever an object is streamed using one of the global streaming functions, the streaming function stores a reference to the object in the stream's context. If the object is already in the context, then instead of streaming the object again, the function writes a reference (called an "alias") to the previously-streamed instance of the object.

Figure 7A:
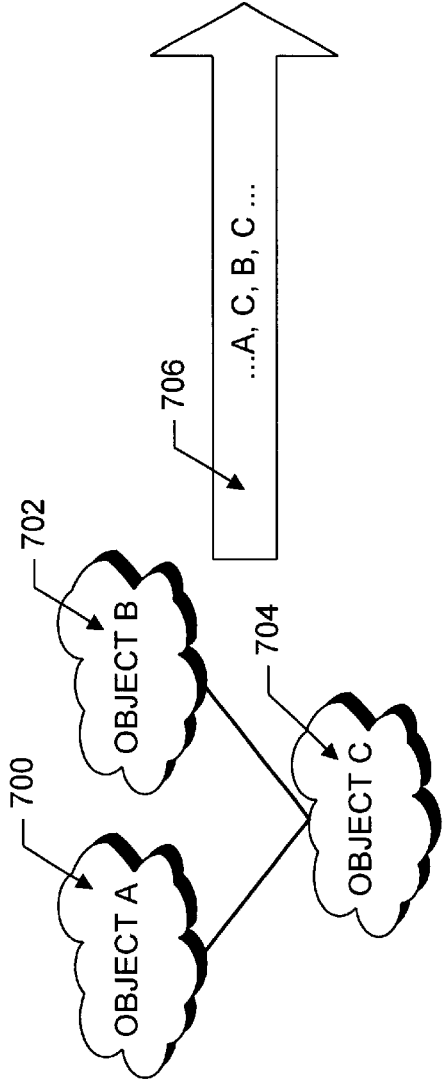
FIG. 7A is a schematic diagram illustrating object streaming without references.
Figure 7B:
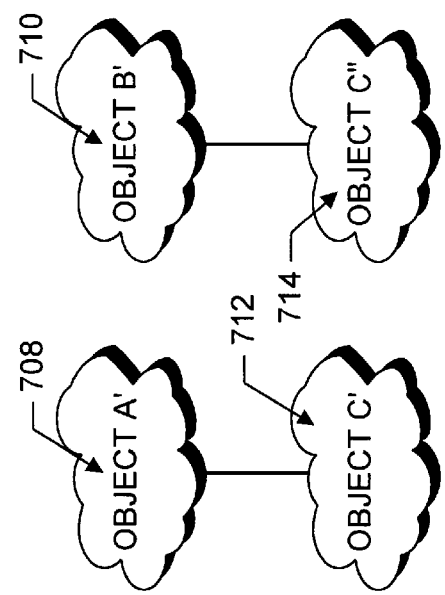
FIG. 7B is a schematic diagram illustrating object streaming with references.
Figure 7B:
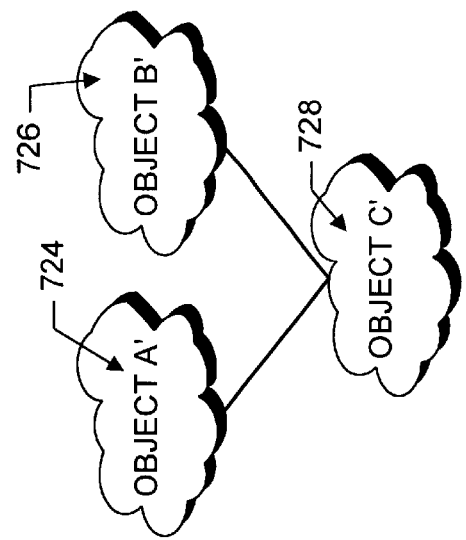

Aliases reduce the stream size and allow a stream writer to preserve reference information in the stream. The operation of aliases is illustrated in FIGS. 7A and 7B. FIG. 7A illustrates streaming without aliases. It shows two objects, 700 and 702, designated A and B, that both refer to the same object 704, designated C. Without aliases, the stream writer would stream object A, which would cause object C to be streamed, and then the stream writer would stream object B, which would cause object C to be streamed again as schematically indicated by arrow 706. At the other end of the data stream, the stream reader would construct an object copy 708, designated A', then an object copy 712, designated C', and construct a reference between the two objects. The reader would then construct an object copy 710, designated as B', then another object copy 714, designated C", and set up the reference. The end result is that objects 708 and 710 point to two different copies of C, objects 712 and 714. The fact that objects 708 and 710 should point to the same object would have been lost.

FIG. 7B shows streaming with aliases. In this case, the stream writer writes object 716, designated as A, then object 720, designated as C, then object 718, designated as B and then an alias, designated as ^C, to the previously streamed version of C. These items are transported on the data stream indicated by arrow 722. At the other end of the data stream, the stream reader would construct an object copy 724, designated A', then an object copy 728, designated C', and construct a reference between the two objects. The reader would then construct an object copy 726, designated as B'. When the stream reader sees the alias it knows to connect object copy 726 to the previously-read version of object C, which is object 728. Thus, the reference is preserved.

However, a problem arises when the aliased object is not recognized by the stream reader. In the example illustrated in FIG. 7B above, a problem occurs if the stream reader did not read the streamed version of object 720. This may happen if object 720 was part of an extension or an alternate that was skipped by the reader. Then the subsequent alias to the unrecognized object (^C) would be invalid.

In order to prevent this problem from arising, the inventive data compatibility system modifies the stream writer to detect that the referenced object might not be read by some readers. At that point, instead of writing an ordinary alias the stream writer writes a "robust" alias onto the stream. The robust alias contains alias information plus a re-streamed copy of the aliased object. When the robust alias is read, the reader checks if it has seen the aliased object. If it has, it fixes up the pointer and skips over the re-streamed copy. If it has not seen the aliased object, it proceeds to read the re-streamed object from the robust alias.

There are several cases where robust aliases are used. For example, robust aliases can be used with class extensions. Since class extensions might not be read by the reader, an alias that the reader encounters is potentially invalid if it refers to class information (which creates an object) that is outside the current class extension or any parent class of the current extension. In this latter case, a robust alias must be written, otherwise, a simple alias can be used.

Clearly there can be no aliasing between alternates, since at most one of them will be read. Therefore, when two alternates reference the same object it should be streamed twice. However, if there is an external reference to an object in one of the alternates, then a robust alias must be streamed since that alternate may or may not be read.

Another case concerns an external reference to an object that appears in more than one alternate. For example, suppose that two alternates each contain copies of an object, and that an external object also references that object. If the external object references the object in one of the alternates, then that reference will be broken for stream readers that choose the other alternate.

In accordance with the principles of the present invention, information about duplicate objects is kept in the alternate wrappers. Each alternate is wrapped like an extension so that its length can precede it on the stream and the duplicate object information is written on the stream along with the length. In the example above, the second alternate can include information that indicates that the object which it references is identical to the object that is referenced by the first object. All readers will see this information because the alternate headers are read automatically. The reader can use this information to update the context and maintain the reference no matter which alternate it chooses.

Since this new data is an extension of the existing wrapper class, the new equivalence data must be streamed before the length, (that way it can be skipped by application built with older frameworks). Since the amount of equivalence information is not known beforehand, enough space must be left on the stream to hold the maximum number of duplicates. This maximum number is the number objects that were streamed in all previous alternates.

The inventive data compatibility system introduces private stream wrapper classes which construct objects that wrap a given stream and filter the streamed data. For completeness, these classes are included in the stream wrapper class hierarchy illustrated in FIGS. 5 and 6. These private classes include a TRobustAliasInputStream class 606 and a TRobustAliasOutputStream class 610, which handle the streaming of robust aliases, and a TAlternateEnableStream class 506, which is used to optimize alternate streaming as described below.

Besides tracking streamed data, wrappers can also optimize streaming. One example is a TAlternateEnableStream constructed from the TAlternateEnableStream class 506. This latter stream is a delegating stream that controls whether or not alternates are streamed. As previously mentioned, the process of constructing and streaming alternates can slow the streaming process considerably, so it is important to avoid streaming alternates wherever possible. Also, as explained above, alternates need only be streamed when the object is being flattened to a persistent stream. Within the object's streaming operator it is possible to determine whether or not the stream is persistent, but it is not possible to determine whether or not the object is being flattened. In order to determine this latter condition, the Flatten( ) function needs to be able to signal the streaming operator that the object is being flattened and not monomorphically streamed.

Figure 8:
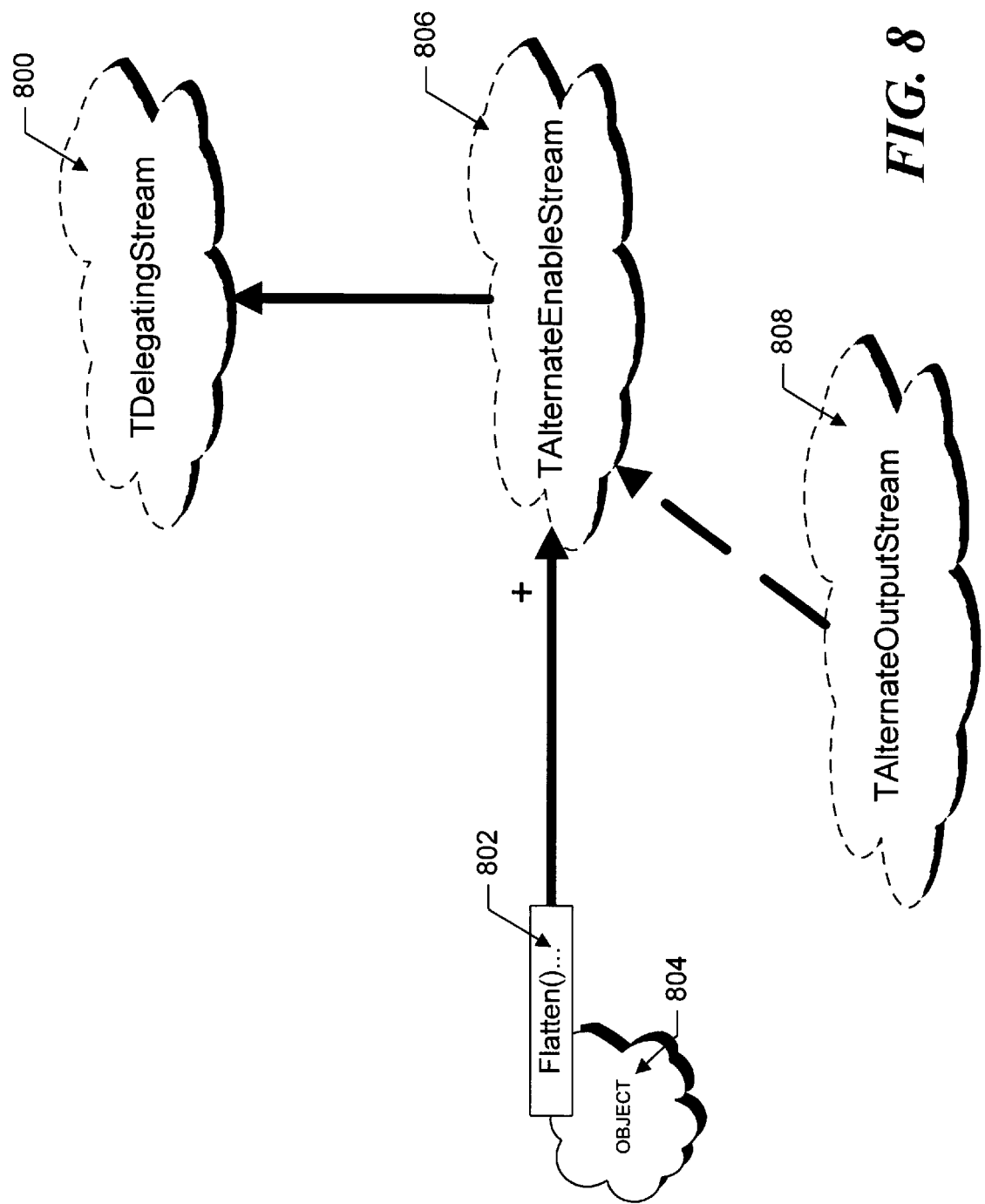
FIG. 8 is a schematic diagram illustrating the use of the TAlternateEnableStream object to wrap an TAlternateOutputStream object to enable the use of alternates.

In accordance with the principles of the present invention, the Flatten( ) function does this by wrapping its given stream with a TAlternateEnableStream and passing the latter to the object's streaming operator. This operation is illustrated in FIG. 8. The Flatten( ) function 802 of an object 804 first determines whether alternates are necessary by determining whether the stream is persistent. If alternates are necessary the Flatten( ) function constructs a TAlternateEnableStream from class 806 (which descends from the TDelegatingStream class 800) and wraps the stream with it.

If the streaming operator defines alternates, it will contain a TAlternateOutputStream constructed from class 808. At construction time, this TAlternateOutputStream checks the type of the stream. If it is a TAlternateEnable stream then TAlternateOutputStream knows that the object is being flattened and therefore alternates should be streamed. If the stream is not a TAlternateEnableStream then the object is merely being streamed and therefore alternates are not necessary.

The TAlternateEnableStream class 506 constructs an internal delegating stream that enables a TAlternateOutputStream object to stream alternates. The TAlternateEnableStream class declaration is as follows:

```
#ifndef NO__Internal
    class TAlternateEnableStream : public TDelegatingStream {
    public:
        TAlternateEnableStream(TStream* streamToAlias);
        virtual ~TAlternateEnableStream();
    }
#endif
```

The TRobustAliasOutputStream class 610 constructs an object which writes a robust alias to the stream. Its class declaration is as follows:

```
#ifndef NO__Internal
    class TRobustAliasOutputStream : public TDelegatingStream {
    public:
        TRobustAliasOutputStream();
        TRobustAliasOutputStream(TStream* streamToAlias,
                                 ContextObjectIndex);
        TRobustAliasOutputStream (const
                                 TRobustAliasOutputStream&);
        virtual ~TRobustAliasOutputStream();
        TRobustAliasOutputStream& operator=(const
                                 TRobustAliasOutputStream&);
        TStream& operator>>=(TStream&);
        TStream& operator<<=(TStream&);
    protected:
        TRobustAliasHeader    header;
        TBufferedStream       fStreamWrapper;
        TVirtualContext       TVirtualContext;
    }
#endif
```

The TRobustAliasInputStream class 606 constructs an object which reads a robust alias from the stream. Its declaration is as follows:

```
#ifndef NO_Internal
    class TRobustAliasInputStream : public TDelegatingStream {
        public:
            TRobustAliasInputStream();
            TRobustAliasInputStream(TStream* streamToAlias);
            TRobustAliasInputStream (const
                                    TRobustAliasInputStream);
            virtual ~TRobustAliasInputStream();
            TRobustAliasInputStream& operator=(const
                                    TRobustAliasInputStream&)
            virtual TStream& operator>>=(TStream&);
            virtual TStream& operator<<=(TStream&);
        protected:
            TRobustAliasHeader    header;
            TBufferedStream       fStreamWrapper;
            TVirtualContext       TVirtualContext;
    }
#endif
```

Figure 9:
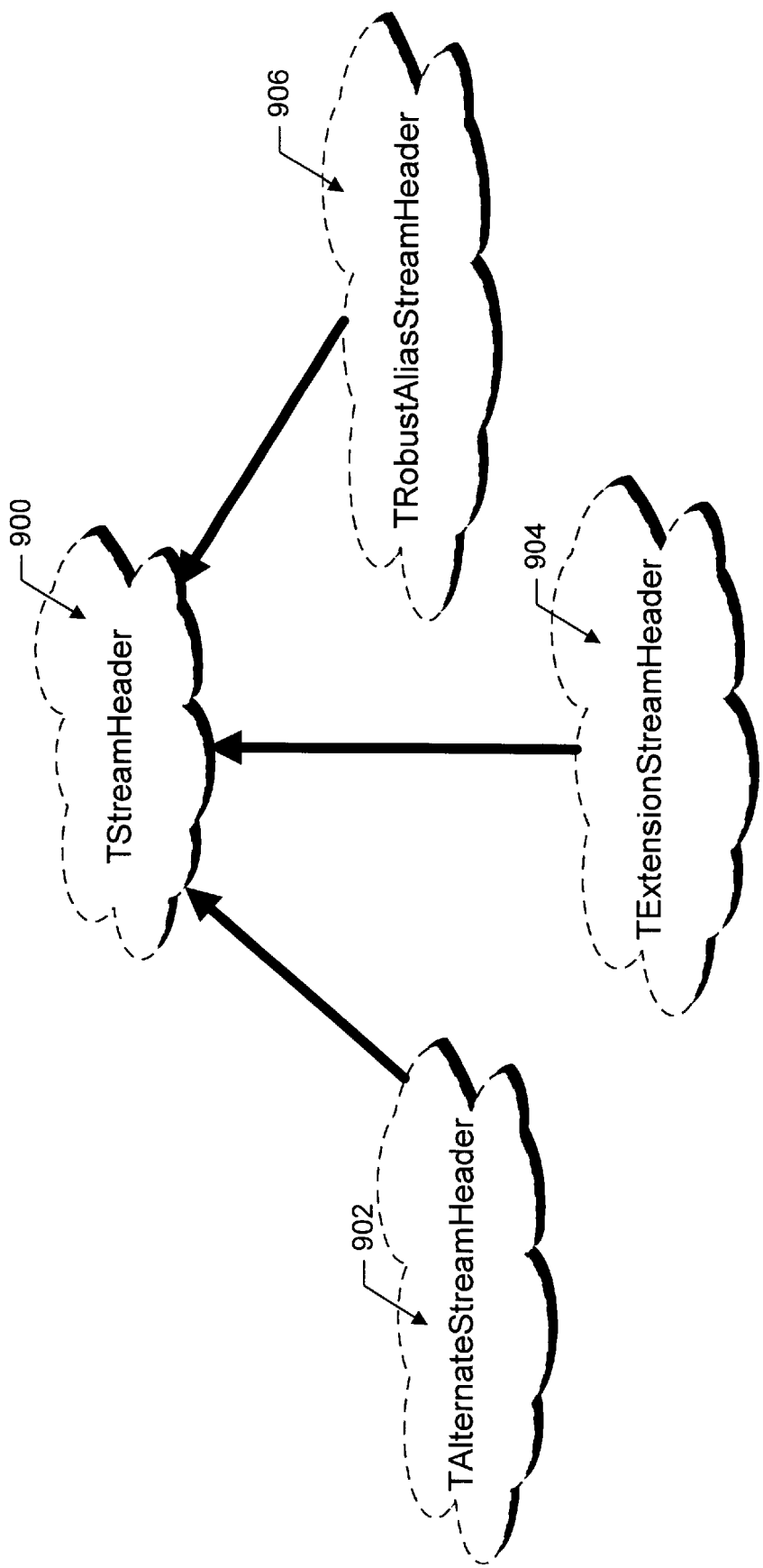
FIG. 9 is a class hierarchy diagram of the inventive stream header support classes.

The private stream wrapper classes are implemented using private stream header classes, which maintain statistics about the wrapped data, such as its length, the number of flattened objects the data contains and whether or not it aliases external objects. Some of this data comes from the stream, some comes from the context and some comes from other places. There are specialized headers to track each type of data. The full stream header class hierarchy is illustrated in FIG. 9.

Every set of wrapper classes has its own header class. For example, TAlternateInputStream objects and TAlternateOutputStream objects use a TAlternateStreamHeader class 902 and TExtensionInputStream objects and TExtensionOutputStream objects use a TExtensionStreamHeader class 904. Each of the header classes 902 and 904 descend from a common parent class, TStreamHeader 900, and are specialized to track only that stream data which is important to that particular wrapper.

The TStreamHeader class 900 is the basic header class. It keeps track of the length of the wrapped data, the number of wrapped objects and whether or not the data is self contained. Its class declaration is as follows:

```
#ifndef NO_Internal
    class TStreamHeader {
        public:
            TStreamHeader();
            TStreamHeader (const TStreamHeader&);
            virtual ~TStreamHeader();
            virtual void InitializeHeaderData (const TStream&);
            virtual void ComputeHeaderDelta (const TStream&);
            virtual void Subtract header (const TStreamHeader&);
            virtual void JumpToEnd (const TStream&) const;
            StreamPosition  GetDataLength() const;
            unsigned long   GetObjectCount() const;
            void            SetSelfContained(bool);
            bool            IsSelfContained() const;
            TStreamHeader  operator=(const TStreamHeader&);
            virtual TStream& operator>>=(TStream&);
            virtual TStream& operator<<=(TStream&);
        protected:
            StreamPosition  fInitialStreamPosition;
            StreamPosition  fStreamPositionDelta;
            unsigned long   fInitialObjectCount
            unsigned long   fObjectCountDelta;
            bool            fSelfContained;
    };
#endif
```

The TAlternateStreamHeader class 902 constructs an object which maintains an array of object indexes which is used to record aliases between alternates. The class declaration is:

```
#ifndef NO_Internal
    class TAlternateStreamHeader : public TContextStreamHeader {
        public:
            TAlternateStreamHeader();
            TAlternateStreamHeader (bool firstAlternate);
            TAlternateStreamHeader (const
                                    TAlternateStream Header&);
            virtual ~TAlternateStreamHeader();
            virtual void  InitializeHeaderData (const TStream&);
            virtual void  ComputeHeaderDelta (const TStream&);
            virtual TStream   operator>>=(STREAM&) const;
            virtual TStream   operator<<=(STREAM&);
        protected:
            void  CleanupArray();
            void  UpdateArray();
            bool                              fFirst;
            TArrayOf<TCollectibleLong>*       fAliasArray;
            ContextObjectIndex                fAlternateStartIndex;
            ContextObjectIndex                fAlternateObjectCount;
    };
#endif
```

The TExtensionStreamHeader class 904 constructs an object which maintains an orthogonal flag that indicates whether the data contained in this extension is orthogonal to all earlier class data. The class declaration is:

```
#ifndef NO_Internal
    class TExtension Stream Header : public TContextStreamHeader {
        public:
            TExtensionStreamHeader()
            TExtensionStreamHeader (bool orthogonal = false);
            TExtensionStreamHeader (const
                                    TExtensionStreamHeader&);
            virtual ~TExtensionStreamHeader();
            void SetOrthogonal (bool);
            bool IsOrthogonal() const;
            TExtensionStreamHeader operator=(const
                                    TExtensionStreamHeader&);
            virtual TStream& operator>>=(TStream&) const;
            virtual TStream& operator<<=(TStream&);
        protected:
            bool      fOrthogonal;
    };
#endif
```

The TRobustAliasHeader class 906 constructs an object which maintains the ID of the aliased object. The class declaration is:

```
#ifndef NO_Internal
    class TRobustAliasHeader : public TContextStreamHeader {
        public:
            TRobustAliasHeader()
            TRobustAliasHeader(ContextObjectIndex);
            TRobustAliasHeader (const TRobustAliasHeader&);
            virtual ~TRobustAliasHeader();
            void                  SetObjectIndex
                                        (ContextObjectIndex);
            ContextObjectIndex    GetObjectIndex() const;
            TRobustAliasHeader    operator=(const
                                        TRobustAliasHeader&);
            virtual TStream& operator>>=(TStream&) const;
            virtual TStream& operator<<=(TStream&);
        protected:
            ContextObjectIndex    fObjectIndex;
    };
#endif
```

Figure 10:
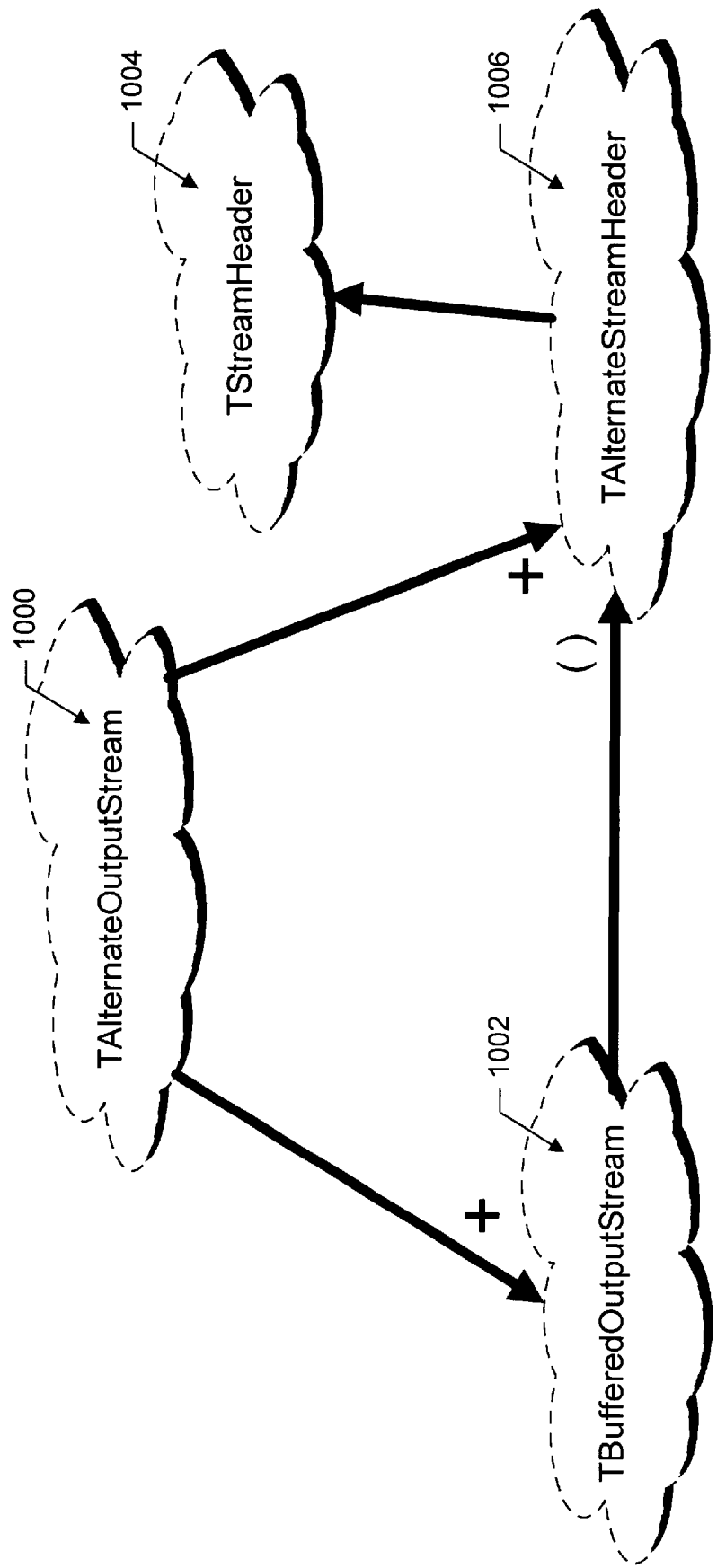
FIG. 10 is a schematic diagram illustrating the use of the steam header classes.
Figure 11C:
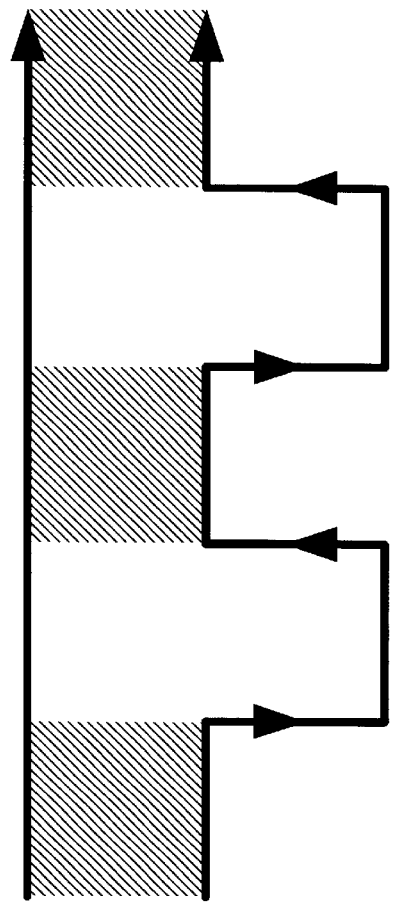
FIGS. 11A–11H are schematic data stream diagrams illustrating the use of virtual contexts to control visibility of objects written to the stream.
Figure 11D:
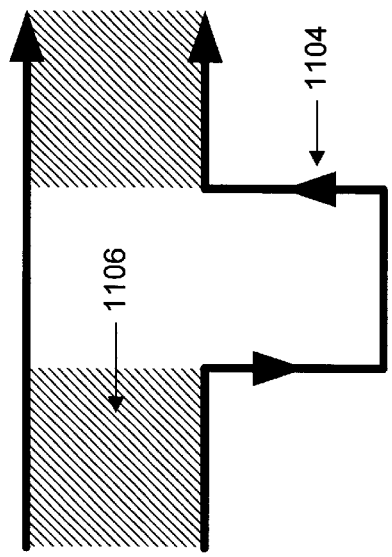
Figure 11A:
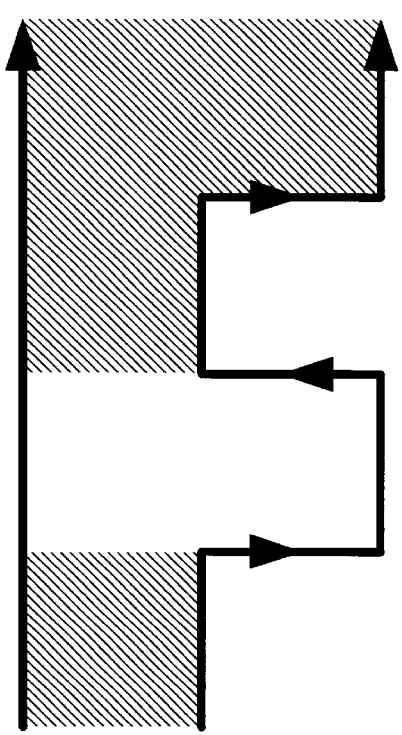
Figure 11B:
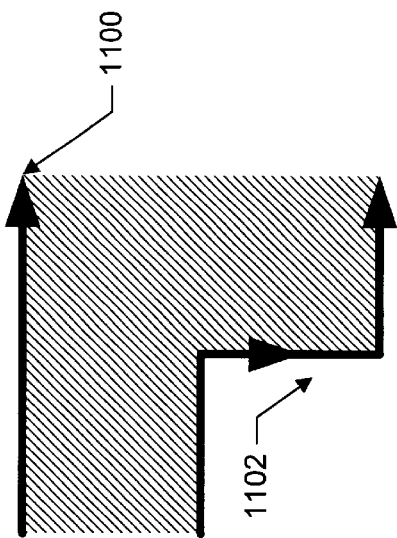
Figure 11E:
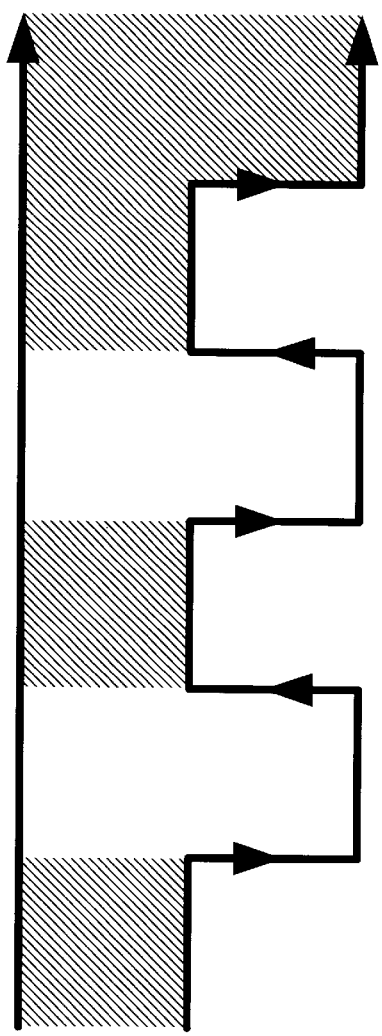
Figure 11F:
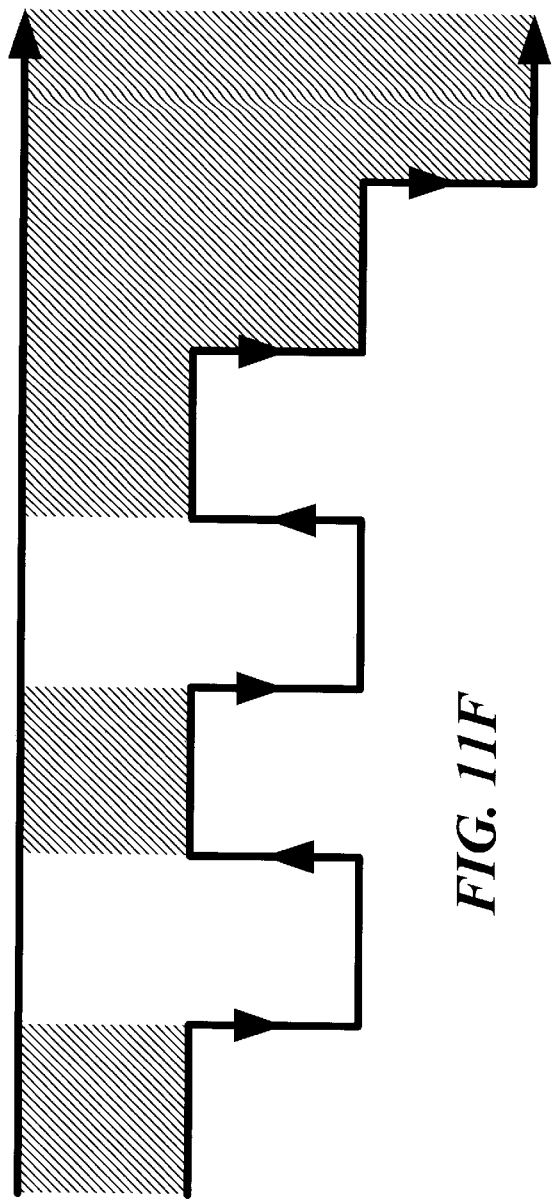
Figure 11G:
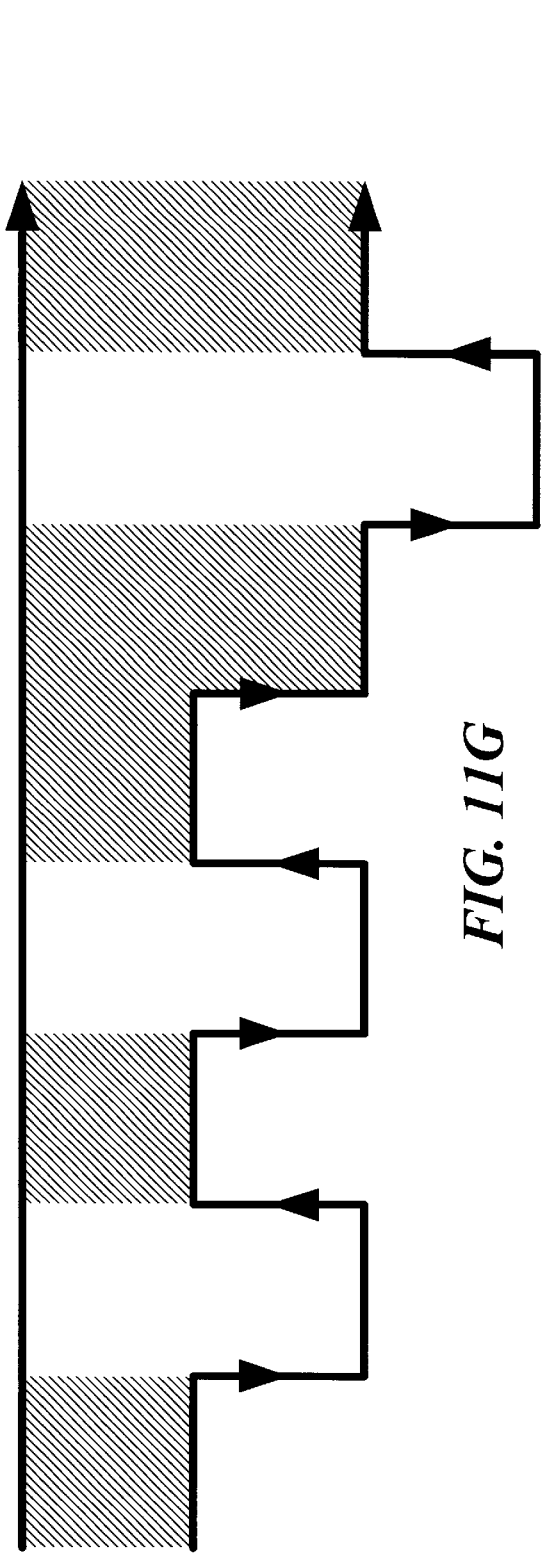
Figure 11H:
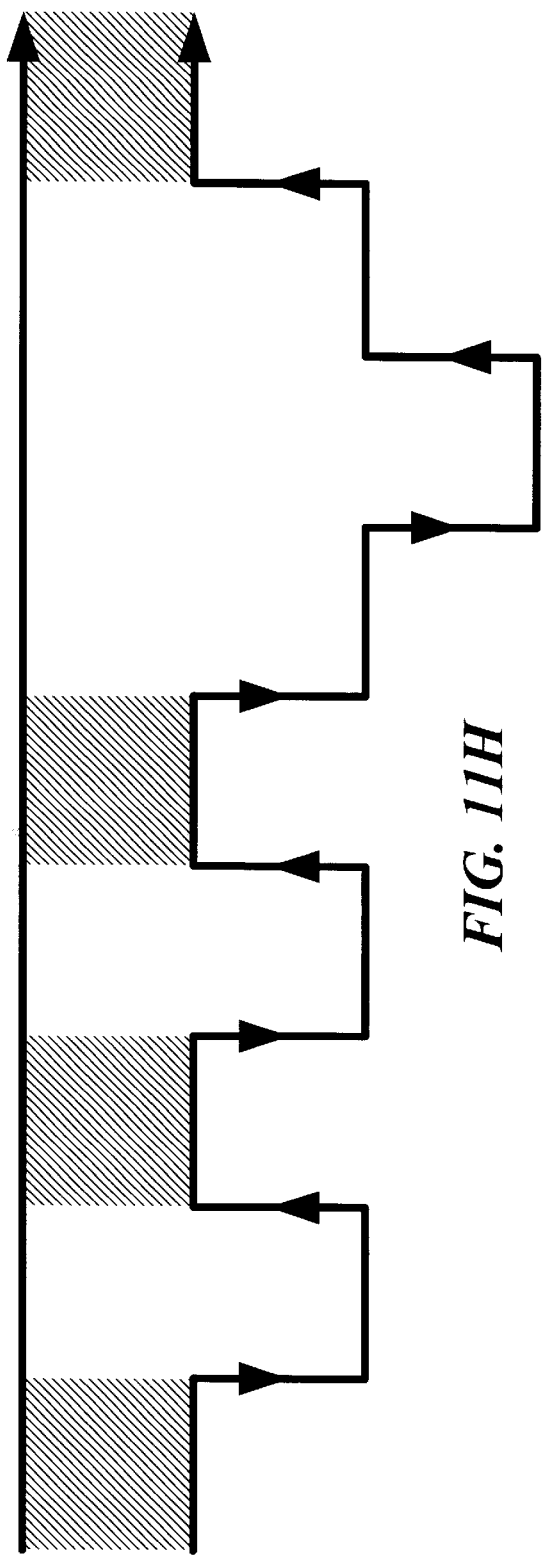
Figure 12A:
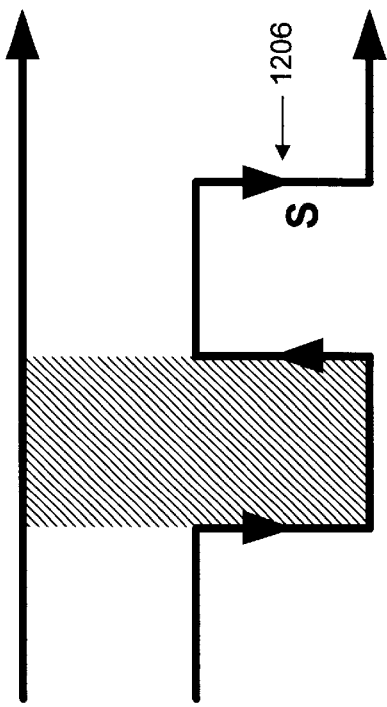
FIGS. 12A–12H are schematic data stream diagrams illustrating the use of virtual context to control sibling relationship of objects written to the stream.
Figure 12B:
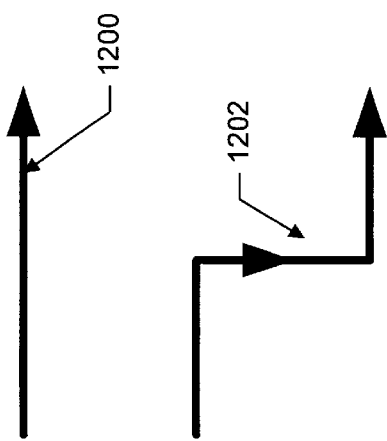
Figure 12C:
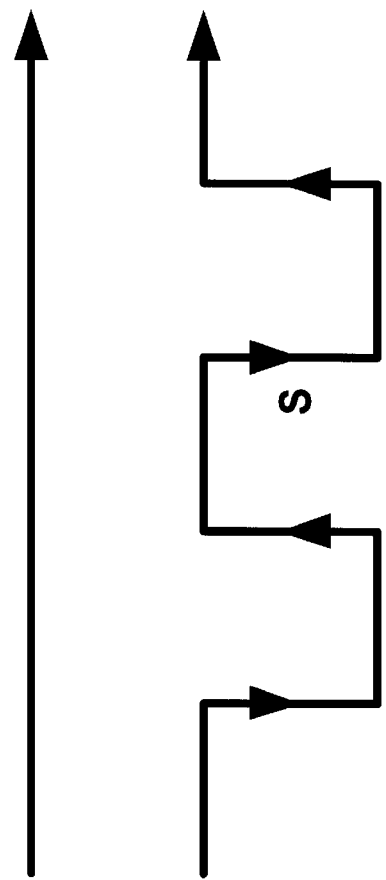
Figure 12D:
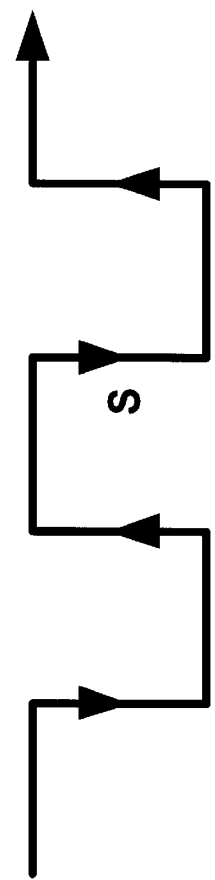
Figure 12E:
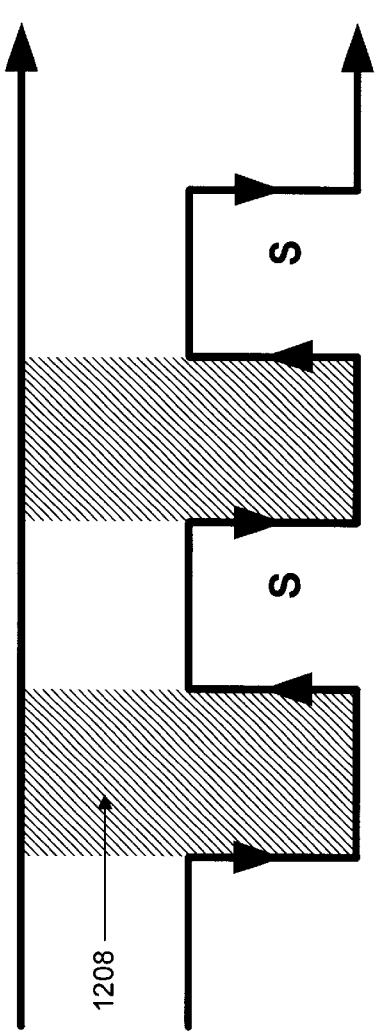
Figure 12F:
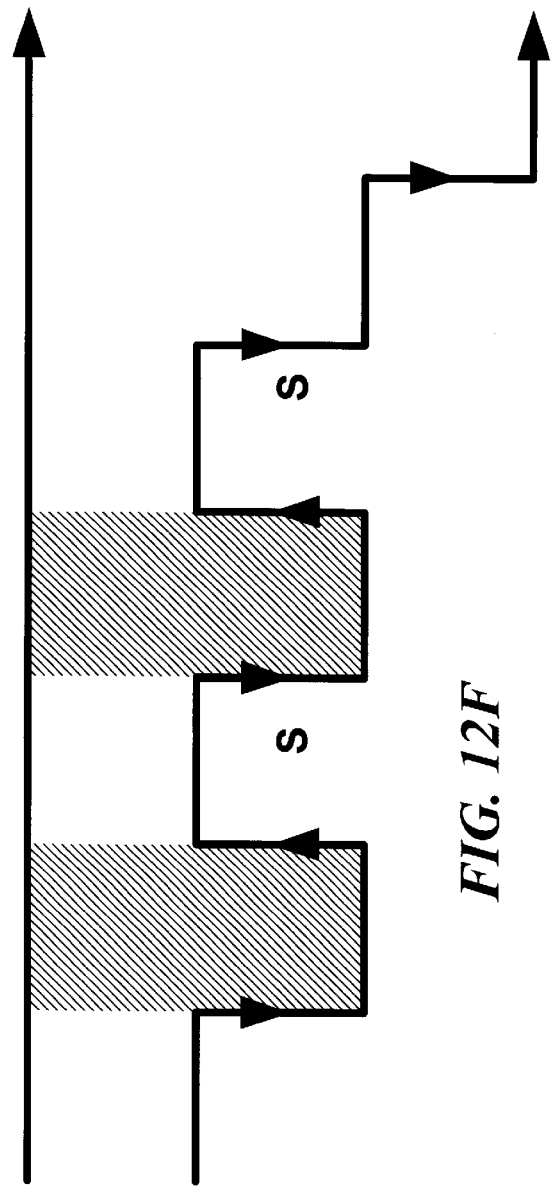
Figure 12G:
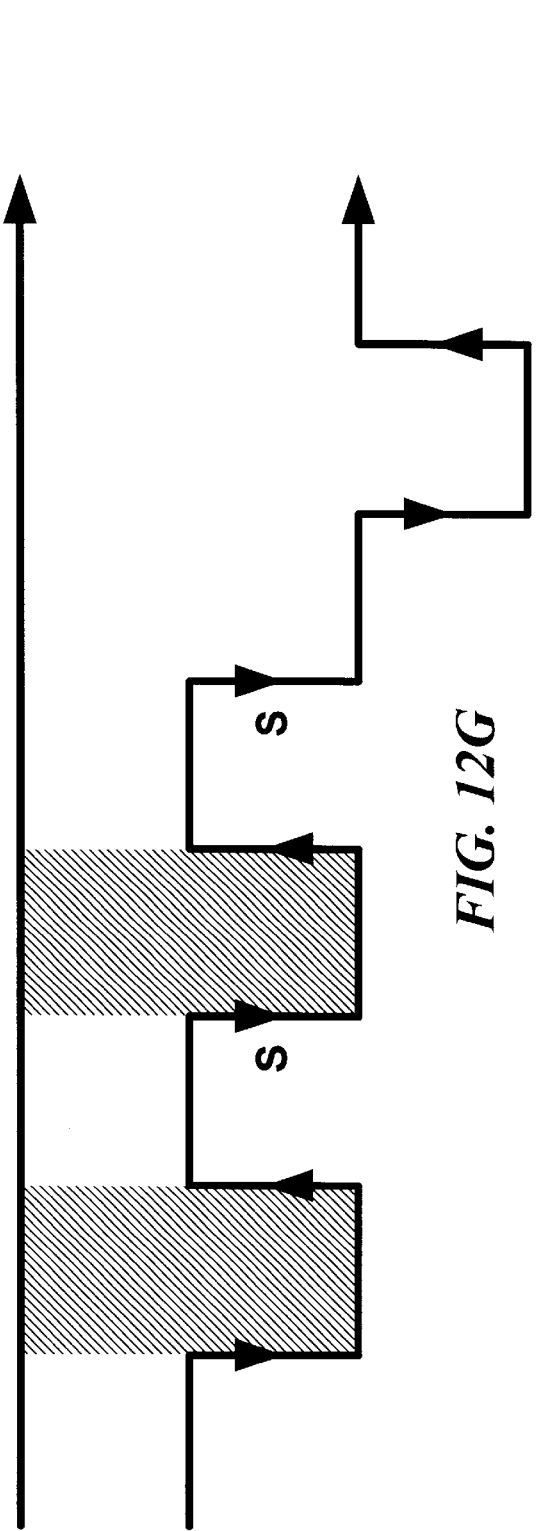
Figure 12H:
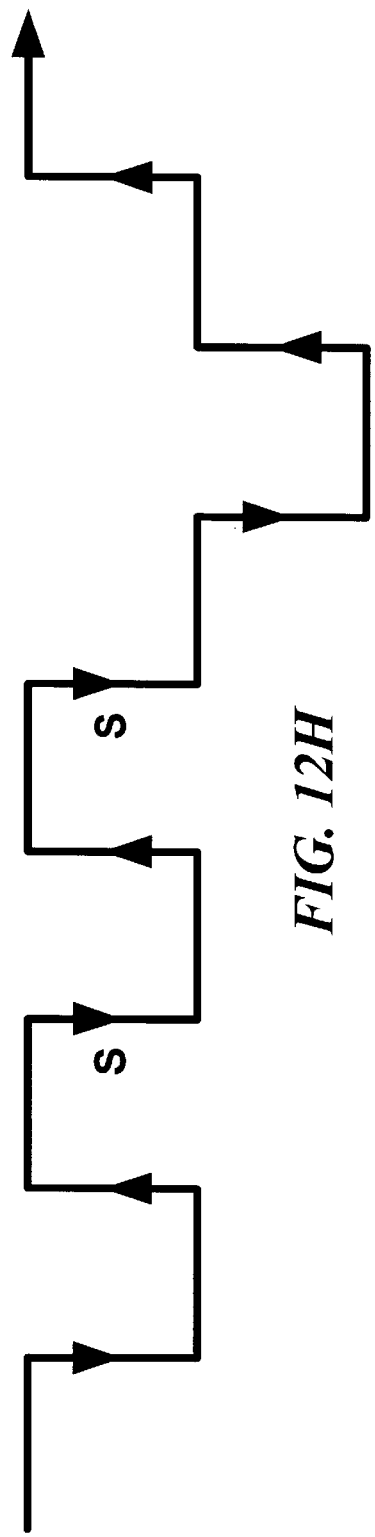

FIG. 10 illustrates stream header usage. A TAlternateOutputStream 1000 owns a TAlternateStreamHeader 1006 which it uses to initialize its TBufferedOutputStream 1002. The TBufferedOutputStream 1002 aliases the header and keeps it in synchronization with the buffered data. When it is time to stream out the buffered data, the TBufferedOutputStream 1002 makes sure that the header is written to the stream before the buffered data.

Private Stream Context Classes

In order to handle the aliasing problem discussed above, the inventive data compatibility system uses a new TContext class that supports nested scopes of visibility between objects. It constructs and maintains a stack of "virtual" contexts that applications can push on the stack and pop off the stack in order to define ranges of visibility. It also stores a visibility flag with each object and provides an IsVisible( ) method that returns the visibility of the given object within the context.

The TContext class is a private class that is used to maintain references to stream objects. It is a modification of the TContext class found in the aforementioned Commonpoint framework. The most notable additions for data compatibility are the virtual context stack and the extra object data, both of which are described below. The TContext class also constructs private TContextObjectData object instances in order to maintain object data. The TContextObjectData instances are created and maintained via use of the Add( ), AddAt( ), Find( ), IncrementCount( ), Remove( ) and Reset( ) methods in the TContext object. The class declaration for TContext is:

```
#ifndef NO__Internal
    typedef const void         ContextObjectData;
    typedef long               ContextObjectIndex;
    const ContextObjectIndex   kInvalidContextObjectIndex;
    class TContext {
        public:
            TContext();
            TContext (const TContext&)
            virtual ~TContext();
            long  GetCount() const;
            void  IncrementCount (unsigned long);
            ContextObjectIndex      Add(ContextObjectData objectToAlias,
                                        bool& newEntry);
            ContextObjectData       AddAt(ContextObjectData objectToAlias,
                                        ContextObjectIndex);
            ContextObjectData       Find(ContextObjectIndex) const;
            void                    Reset();
            void                    MakeAlias(ContextObjectIndex from,
                                        ContextObjectIndex to);
            ContextObjectIndex      GetAliasValue(
                                        ContextObjectIndex)const;
            void                    PushVirtualContext(TVirtualContext*
                                        contextToAdopt);
            const TVirtualContext*  PopVirtualContext();
            ContextObjectData       Remove(ContextObjectIndex);
            bool                    IsVisible(ContextObjectIndex) const;
            bool                    IsInSiblingContext(
                                        ContextObjectIndex) const;
            ContextObjectIndex      GetSiblingStartIndex() const;
            TContext&  operator=(const TContext&);
        private:
            virtual void AllocateInternalTables();
            virtual void CleanupInternalTables();
            class TInternalContextObjectData {
                public:
                    TInternalContextObjectData();
                    TInternalContextObjectData(ContextObjectData*);
                    TInternalContextObjectData (const
                                        TInternalContextObjectData&);
                    virtual ~TInternalContextObjectData();
                    void  Reset();
                    ContextObjectData*   fObject;
                    bool                 fVisible;
                    ContextObjectIndex   fAliasTo;
            };
            TDictionaryOf<TCollectibleLong, ContextObjectIndex>*
                                        fDictionaryOfObjects;
            TArrayOf<TInternalContextObjectData>*
                                        fArrayOfObjects;
            TVirtualContext*           TVirtualContext;
            ContextObjectIndex         fSiblingStartIndex;
            ContextObjectIndex         fPreviousSiblingStartIndex;
            long                       fCount;
    };
#endif
```

The TVirtual Context class is an implementation class that is used to define scopes of objects within a context. It is described below and has the class declaration:

```
#ifndef NO_Internal
    class TVirtualContext {
        public:
            TVirtualContext();
            TVirtualContext (bool sibling = false);
            TVirtualContext (const TVirtualContext&);
            virtual ~TVirtualContext();
            bool                IsSibling() const;
            virtual void        SetSiblingStartIndex(ContextObjectIndex);
            ContextObjectIndex  GetSiblingStartIndex() const;
            virtual void        SetFirstObjectIndex(ContextObjectIndex);
            ContextObjectIndex  GetFirstObjectIndex() const;
            virtual void        SetObjectCount (unsigned long);
            TVirtualContext*    GetNextVirtualContext() const;
            TVirtualContext&    operator=(const TVirtualContext&);
            virtual TStream&    operator>>=(TStream& toWhere) const;
            virtual TStream&    operator<<=(TStream& fromWhere);
        private:
            TVirtual Context*   fNextVirtualContext;
            ContextObjectIndex      fSiblingStartIndex;
            ContextObjectIndex      fStartIndex;
            unsigned long           fCount;
            bool                fIsSibling;
            bool                fIsSelfContained;
    }
#endif
```

The stream compatibility data writers, TExtensionOutputStream and TAlternateOutputStream, discussed above, are coded to manipulate the virtual context stack so that the ranges defined represent the point of view of the receiver. If an object is visible, that means it must have been read by the stream reader. Therefore, the aliasing code in the Flatten( ) function can write simple aliases to visible objects and robust aliases to objects that are not visible.

The algorithm for maintaining the visibility flag is straightforward. Each object that is placed in the context is automatically made visible. When a new virtual context is pushed on the stack there is no change. But when a virtual context is popped off of the stack, all of the objects within that virtual context, (i.e. all of the objects that were added to the context while that virtual context was on the stack), are marked invisible.

A sequence of operations in which a virtual context is pushed onto and popped off of a stack is illustrated in FIGS. 11A–11F. These figures illustrate the return value of TContext::IsVisible on a stream that is being written. The thick horizontal line at the top of each image, for example line 1100, represents the stream, while the stair-stepped line at the bottom of each image represents the virtual context stack on the stream. Down-pointing arrows, for example arrow 1102, indicate when a virtual context was pushed onto the stack, while up-pointing arrows, for example arrow 1104, indicate when a virtual context was popped off of the stack. Objects are written on the stream from left to right in each diagram, and the right-pointing arrow in each diagram represents the current position of the stream. Hatched areas, such as area 1106, on the stream represent objects that are visible from the current position (IsVisible( ) returns TRUE), while light areas on the stream represent objects that are not visible from the current position (IsVisible( ) returns FALSE). Notice that whenever a virtual context is popped, all of the objects that were written to the stream within that virtual context are marked invisible.

In addition to a stack-based parent-child relationship, virtual contexts also support a sibling relationship. Any virtual context which is instantiated with a value of TRUE is declared to be a sibling of the previously-popped virtual context. FIGS. 12A–12H illustrate the return value of TContext::IsInSiblingContext on a stream that is being written. The thick horizontal line, for example line 1200, at the top of each image represents the stream, while the stair-stepped line at the bottom of each image represents the virtual context stack on the stream. Down-pointing-arrows, for example arrow 1202, indicate when a virtual context was pushed onto the stack, while up-pointing arrows, for example arrow 1204, indicate when a virtual context was popped off of the stack. Down-pointing arrows with an S, for example arrow 1206, indicate when a sibling virtual context was pushed onto the stack. Objects are written on the stream from left to right in each diagram, and the right-pointing arrows in each diagram represent the current position of the stream. Hatched areas on the stream, for example, area 1208, represent objects that are in sibling contexts from the current position, while light areas on the stream represent objects that are not in sibling contexts from the current position. Notice how the sibling relationship applies to the previously popped context, whether or not it was a sibling context, and notice that the sibling relationship is transitive.

Non-sibling virtual contexts are used to implement extensions. When it is constructed and initialized, a TOutputExtensionStream object pushes a non-sibling virtual context onto the stack. At destruction time, the TOutputExtensionStream destructor pops the virtual context off the stack, which makes all of the extension objects that were added to the context invisible. This indicates that subsequent aliases to those extension objects should be robust.

Sibling contexts are used to implement alternates. At the start of the first alternate, a TAlternateOutputStream object pushes a non-sibling virtual context onto the stack and at the end of that alternate, the TAlternateOutputStream object pops the non-sibling virtual context off the stack. At the start of each subsequent alternate, the TAlternateOutputStream object pushes a sibling virtual context onto the stack and at the end of that alternate it pops it off the stack. This allows the internal streaming code to use the InSiblingContext( ) method to determine if a referenced object appears in any previous alternate. If it does, then the streaming code records this information in the alternate header.

In addition to the virtual context stack, TContext maintains extra object data. The extra object data consists of a visibility flag and an alias flag and this data is held in an object constructed from a private implementation class called TContextObjectData. TContext sets the visibility flag of each object as described above and provides an IsVisible( ) method to access its value. TContext does not set the alias flag; instead it provides a MakeAlias( ) setter method for this value. TContext::Find uses the alias flag. If the requested object is NIL but has an aliased value, Find( ) will return the aliased value. This is part of the solution to the "aliasing multiple alternates" problem described in a previous section.

Streaming Support Functions

The ReadVersion( ) and WriteVersion( ) functions are modified to accommodate the inventive stream format extension strategy. The modified WriteVersion( ) function indicates the presence of extensions on the stream and optionally accepts an extension bit bucket which it writes to the stream. The modified ReadVersion( ) function skips unknown extensions, optionally saving them in a bit bucket, and hands back to the application a stream that it can understand. The following is an implementation of the ReadVersion( ) function. It is for illustrative purposes only and is not intended to be limiting:

```
Version Info
ReadVersion(TStream& fromWhere, const VersionInfo oldestSupportedVersion,
                      const VersionInfo newestSupportedVersion)
ReadVersion(TStream& fromWhere, const VersionInfo oldestSupportedVersion,
                      const VersionInfo newestSupportedVersion,
                      TExtensionBitBucket&bucket)
{
        VersionInfo version;
        version <<=fromWhere;
        //Check for extensions
        if (version& kExtensionFlagMask) {
                // Clear and ignore any other version flags
                version& = ~kVersionFlagsMask;
                //Read the extension count
                ExtensionInfo      extensions;
                extensions <<=fromWhere;
                // Check that the version is not too low
                if (version < oldestSupportedVersion)
                        throw TInvalidVersionError();
                // Check that the base version is not too high
                if ((version - extensions) > newestSupportedVersion)
                        throw TInvalidVersionError();
                // Skip any versions higher than newestSupportedVersion
                // >>> If this is the version that has a bit bucket<<<
                // Save the extra extension data in the bit bucket
                bucket->ReadExtensions(version -newestSupportedVersion, fromWhere);
                // >>> ELSE if this is the version that does not take a bit bucket <<<
                // Skip the extra extensions.
                for (; version > newestSupportedVersion; version--) {
                        TExtensionInputStream ext(fromWhere);
                        ext.SkipExtensionData();
                // >>> ENDIF <<<
                }
        } else {
        // Clear and ignore any other flags
        version& = ~kVersionFlagsMask;
        // Check that the version is in range
        if( version < oldestSupportedVersion II version >
                                        newestSupportedVersion )
                        throw TInvalidVersionError();
        }
        return version;
}
```

Illustrative pseudo-code for the WriteVersion( ) function is:

```
void
WriteVersion(TStream& toWhere, const VersionInfo version,
                                long extensionCount = 0)
WriteVersion(TStream& toWhere, const Version Info version, long extensionCount,
                                const TExtension BitBucket& bucket)
{
        // Increment the versions if there are saved extensions.
        if (bucket) {
                extensionCount += bucket.ExtensionCount();
                version += bucket.ExtensionCount();
        }
        // Throw an exception if the version number interferes with
```

```
        // the version flags.
        if (version& kVersion FlagsMask) {
            throw TInvalidVersionError();
        } else {
            if (extensionCount > 0) {
                // Write the version number and the extension count.
                version I= kExtensionFlagMask;
                version >>= toWhere;
                extensionCount >>= toWhere;
                // >>> IF this is the version that has a bit bucket <<<
                // Write any saved extensions.
                bucket->WriteExtensions(toWhere);
                // >>> ENDIF <<<
            } else {
                version >>= toWhere;
            }
        }
    }
}
```

As previously mentioned, the Flatten( ) and Resurrect( ) functions perform polymorphic streaming. The following are high-level descriptions of the operations of these functions:

```
template <class AType>
void Flatten (const AType* objPtr, TStream& toWhere)
{
    if (objPtr == NIL) {
        // Write a NIL tag to the stream...
    } else {
        // Wrap the stream with a TAlternateEnableStream to enable alternates...
        // Add objPtr to the context..
        // Check the result.
        if (objPtr was already in the context) {
            if (objPtr is visible in the context) {
                // Write a simple alias to the stream...
            } else {
                // Write a robust alias to the stream...
            }
        } else {
            //Write the object to the TAlternateEnableStream(object tag,
            //type info, object data)...
        }
    }
}
```

An illustrative high-level description of the resurrect function is given by the following:

```
template <class AType>
void Resurrect(AType*& newObj, STREAM& fromWhere)
{
    if (NIL tag is on the stream) {
        return NIL;
    } else {
        // Process alternates until one is recognized or end of the list
        is reached.
        while (not done) {
            // Read the header tag . . .
            switch (on the header type) {
                case (start alternates tag):
                    haveAlternates = TRUE;
                    break;
                case (robust alias tag):
                    // Check the context . . .
                    if (the object is in the context) {
                        // Skip the copy of the object in the alias . . .
                        // Check the type of the object in the context . . .
```

```
                        if (bad type) {
                            // Skip all remaining alternates . . .
                            throw TTypeException(
        kObjectDoesNotDeriveFromBase)
                        }
                        // Set newObj to point to the object in the context . . .
                        done = TRUE;
                        break;
                    }
                    // The object is not in the context, so drop through into the
                    //object tag case to read the object out of the robust alias.
                case (object tag):
                    // Read the object type . . .
                    // Check the type . . .
                    if (bad type) {
                        if (no alternates)
                            throw TTypeException(
        kUnknownLibraryForClass)
                        // Skip this alternate . . .
                        break;
                    }
```

```
            // Construct and read in the object . . .
            // Add the object to the context . . .
            done = TRUE;
            break;
        case (simple alias tag):
            //Check the context . . .
            if (the object is in the context) {
                // Check the type of the object in the context . . .
                if (bad type ) {
                    // Skip all remaining alternates . . .
                    throw TTypeException(
                        kObjectDoesNotDeriveFromBase)
                }
                // Set newObj to point to the object in the context . . .
                done = TRUE;
                    break;
            }else {
                // The object was not in the context.
                // Skip all remaining alternates . . .
                throw TTypeException(kObjectNotFoundIn
                    Context);
            }
            done = TRUE;
            break;
        case (end of alternates tag):
            // No valid alternates.
            throw TTypeException(kUnknownLibraryForClass);
        }
        // Skip all remaining alternates . . .
        }
    }
}
```

As mentioned in the public section discussion of the Flatten( ) and Resurrect( ) functions, there are also versions which accept bit buckets and which flatten an object without its alternates. These functions inhibit the object from streaming its alternates by failing to wrap the given stream with a TAlternateEnableStream object. This disables the TAlternateOutputStream object in the object's stream-out operator, since the a TAlternateOutputStream object will only accept alternates if the type of the stream it wraps is a TAlternateEnableStream. With TAlternateOutputStream disabled, only the first alternate (the object itself) is written to the stream.

What is claimed is:

1. Apparatus for allowing a first object-oriented program created with a first framework version to polymorphically stream object information to a second object-oriented program created with a second framework version, the apparatus comprising:
   a stream writer function in the first object-oriented program for generating a stream that contains both original object information recognized by the first object-oriented program followed by substitute object information recognized by the second object-oriented program in the same stream; and
   a stream reader function in the second object-oriented program, responsive to streamed object information for examining the streamed object information to determine whether the original object information is recognized by the second object-oriented program and for reading the original object information from the stream when the original object information is recognized by the second object-oriented program and for skipping the original object information and reading the substitute object information from the stream when the original object information is not recognized by the second object-oriented program.

2. Apparatus according to claim 1 wherein the stream reader function comprises a method for discarding the original object information when the stream reader function does not recognize the original object information.

3. Apparatus according to claim 1 wherein the stream reader function comprises a method for saving the original object information when the stream reader function does not recognize the original object information.

4. Apparatus according to claim 3 further comprising a second stream writer function in the second object and wherein the second stream writer function comprises means for streaming the saved original object information back to the first object-oriented program.

5. Apparatus according to claim 1 wherein the original object information comprises base object information and extension information and wherein the stream writer comprises means for streaming the extension information followed by the base object information.

6. Apparatus according to claim 5 wherein the stream reader function comprises means for skipping the extension information and reading the base object information when the stream reader function does not recognize the extension information.

7. Apparatus according to claim 1 wherein the substitute object information comprises information for an alternate object which is recognized by the second object-oriented program.

8. Apparatus according to claim 7 wherein the stream writer function comprises a Flatten function for streaming both the original object information and the alternate object information.

9. Apparatus according to claim 7 wherein the stream reader function comprises a Resurrect function for reconstructing the original object information when the stream reader recognizes the original object information and for reconstructing the alternate object information when the stream reader does not recognize the original object information.

10. Apparatus according to claim 1 wherein the stream writer comprises means for constructing a context object which maintains references to the object information.

11. A method for allowing a first object-oriented program created with a first framework version to polymorphically stream object information to a second object-oriented program created with a second framework version, the method comprising the steps of:
   (a) generating with the first object-oriented program a stream that contains both original object information recognized by the first object-oriented program followed by substitute object information recognized by the second object-oriented program in the same stream;
   (b) examining streamed object information in the second object-oriented program to determine whether the original object information is recognized by the second object-oriented program;
   (c) reading the original object information from the stream in the second object-oriented program when the original object information is recognized by the second object-oriented program; and
   (d) skipping the original object information and reading the substitute object information from the stream when the original object information is not recognized by the second object-oriented program.

12. A method according to claim 11 wherein step (d) comprises the step of:
   (d1) discarding the original object information when the stream reader function does not recognize the original object information.

13. A method according to claim 11 wherein step (d) comprises the step of:
  (d2) saving the original object information when the stream reader function does not recognize the original object information.

14. A method according to claim 13 further comprising the step of:
  (e) streaming the saved original object information back to the first object-oriented program.

15. A method according to claim 11 wherein the original object information comprises base object information and extension information and wherein step (a) comprises the step of:
  (a1) streaming the extension information followed by the base object information.

16. A method according to claim 15 wherein step (d) comprises the step of:
  (d3) skipping the extension information and reading the base object information when the stream reader function does not recognize the extension information.

17. A method according to claim 11 wherein step (a) comprises the step of:
  (a2) streaming as the substitute object information, information for an alternate object which is recognized by the second object-oriented program.

18. A method according to claim 17 wherein step (a) comprises the step of:
  (a3) streaming both the original object information and the alternate object information.

19. A method according to claim 17 wherein step (c) comprises the step of:
  (c1) reconstructing the original object information when the stream reader recognizes the original object information; and
step (d) comprises the step of:
  (d4) reconstructing the alternate object information when the stream reader does not recognize the original object information.

20. A method according to claim 11 wherein step (a) comprises the step of:
  (a4) constructing a context object which maintains references to the object information.

21. A computer program product for allowing a first object-oriented program created with a first framework version to polymorphically stream object information to a second object-oriented program created with a second framework version, the computer program product comprising a computer usable medium having computer readable program code thereon, including:
  program code in the first object-oriented program for generating a stream that contains both original object information recognized by the first object-oriented program followed by substitute object information recognized by the second object-oriented program in the same stream;
  program code in the second object-oriented program for examining streamed object information to determine whether the original object information is recognized by the second object-oriented program;
  program code in the second object-oriented program for reading the original object information from the stream when the original object information is recognized by the second object-oriented program; and
  program code for skipping the original object information and reading the substitute object information from the stream when the original object information is not recognized by the second object-oriented program.

22. A computer program product according to claim 21 wherein the program code for skipping the original object information comprises program code for discarding the original object information when the stream reader function does not recognize the original object information.

23. A computer program product according to claim 21 wherein the program code for skipping the original object information comprises program code for saving the original object information when the stream reader function does not recognize the original object information.

24. A computer program product according to claim 23 further comprising program code for streaming the saved original object information back to the first object-oriented program.

25. A computer program product according to claim 21 wherein the original object information comprises base object information and extension information and wherein the program code in the first object-oriented program for streaming original object information and substitute object information comprises program code for streaming the extension information followed by the base object information.

26. A computer program product according to claim 25 wherein the program code for skipping the original object information comprises program code for skipping the extension information and reading the base object information when the stream reader function does not recognize the extension information.

27. A computer program product according to claim 21 wherein the program code in the first object-oriented program for streaming original object information and substitute object information comprises program code for streaming as the substitute object information, information for an alternate object which is recognized by the second object-oriented program.

28. A computer program product according to claim 27 wherein the program code in the first object-oriented program for streaming original object information and substitute object information comprises program code for streaming both the original object information and the alternate object information.

29. A computer program product according to claim 27 wherein the program code for reading the original object information comprises program code for reconstructing the original object information when the stream reader recognizes the original object information, and wherein the program code for skipping the original object information comprises program code for reconstructing the alternate object information when the stream reader does not recognize the original object information.

30. A computer program product according to claim 21 wherein the program code in the first object-oriented program for streaming original object information comprises program code for constructing a context object which maintains references to the object information.

* * * * *